United States Patent
Mann et al.

(10) Patent No.: US 6,314,093 B1
(45) Date of Patent: Nov. 6, 2001

(54) TRAFFIC ROUTE FINDER IN COMMUNICATIONS NETWORK

(75) Inventors: Jason Warren Mann, Borehamwood; John Ian Turner, Royston, both of (GB); Anthony Richard Phillip White, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/088,805

(22) Filed: Jun. 2, 1998

(30) Foreign Application Priority Data

Dec. 24, 1997 (GB) .................................................. 9727163

(51) Int. Cl.[7] ....................................................... H04L 3/24
(52) U.S. Cl. ............................................ 370/351; 370/254
(58) Field of Search ..................................... 370/351, 389, 370/390, 391, 392, 395, 396, 428, 401, 467, 235, 254, 252, 255, 256, 352, 353, 356, 355, 400, 399, 394, 432, 474, 475, 476, 403, 406, 407, 409; 340/825.01, 825.03, 825.5, 927

(56) References Cited

U.S. PATENT DOCUMENTS 5,754,543 * 5/1998 Seid ........................................ 370/256
5,881,243 * 3/1999 Zaumen et al ........................ 370/238
6,151,304 * 11/2000 Doshi et al. .......................... 370/216

FOREIGN PATENT DOCUMENTS 7 245 626   9/1995   (JP) .
WO 87/03763   6/1987   (WO) .

* cited by examiner

Primary Examiner—Dang Ton
(74) Attorney, Agent, or Firm—Lee, Mann, Smith, McWilliams, Sweeney & Ohlson

(57) ABSTRACT

A route finder means and method for finding routes to satisfy a plurality of connection requests in a communications network comprising a plurality of nodes connected by a plurality of links. A cost is assigned to each network link. Arrays of eight shortest paths of links between each pair of nodes in the network are created. Bit strings comprising for example a 3 bit binary number for each point-to-point connection request are generated. Each 3 bit number is an index to one element of the shortest path array for each connection request's source and destination nodes. The bit strings are assembled into population members which are manipulated by genetic algorithms. The fitness of the population members is evaluated by calculating the cost of traversing the routes represented by the bit strings. The route finder means and method has an ability to split traffic over multiple routes, and to handle different traffic types, eg different bit rate traffic types. The route finder means and method is generic to a plurality of different communications network types.

6 Claims, 23 Drawing Sheets

[nodes] ~1201
n_1 {031} ~1202
n_2 {461}
n_3 {101}

[links] ~1203
{n_1 1} {n_2 1} 622 NetworkLinkDuplex ~1204
{n_1 2} {n_3 1} 602 NetworkLinkDuplex
{n_2 2} {n_3 1} 622 NetworkLinkDuplex

[linkstate] ~1205
{n_1 1} {n_2 1} 402 ~1206

[nodestate] ~1207
n_1 1 ~1208

[linkReliability] ~1209
{n_1 1} {n_2 1} 0.999 ~1210

[nodeReliability] ~1211
n_1 0.999 ~1212

[costs] ~1213
{n_1 1} {n_2 3} {{data 1} voice 2}} ~1214

Fig. 12

[traffic] ~1501
983 n_1 n_8 165 data {5*} ~1502
984 n_2 n_7 210 voice {2 50 50} ~1503

[multipoint] ~1504
985 n_1 {n_2 n_3} 160 ~1505

~1506
[constraints]
983 {include links}{{n_1 1}{n_2 1} {n_2 2}{n_3 2}}} ~1507
983 {exclude nodes {n_5 n_6}} ~1508

Fig. 15

[problemparameters] ~1601 pathlengthWeight=10 ~1602 balancingWeight=5 ~1603

[gaparameters] ~1604 steps=1000 ~1605 statsUpdateFreq=500 ~1606

Fig. 16

[routes] ~2201

{983 n_1 n_8 data{{n_1 1}{n_2 1}{n_6 1}{n_8 1}} ~2202
{984 n_2 n_7 voice {{n_2 2}{n_4 1}{n_5 1}{n_7 1}}

Fig. 22

TRAFFIC ROUTE FINDER IN COMMUNICATIONS NETWORK

FIELD OF THE INVENTION

The present invention relates to a method and apparatus for finding routes for a plurality of connections in a communications network comprising a plurality of node elements connected by a plurality of link elements.

BACKGROUND TO THE INVENTION

A conventional broadband circuit switched communications network, for example a telephony network or a mobile phone network, comprises a plurality of nodes, at which are provided node equipment, the nodes connected by a plurality of communications links, the links comprising link equipment. The node equipment may comprise, for example a telecommunications switch apparatus, and the links may comprise a terrestrial link, eg an optical fiber link or coaxial cable or a wireless link.

An increasing range of services are delivered over such networks, including as examples, video on demand, video conferencing, distance learning, and internet services. Such services involve delivering different traffic data types, eg voice traffic, video or computer data traffic, having different characteristics, some types of traffic being more sensitive to delay than others and the different traffic types having different ranges of bitrate requirements. These services may involve delivery of data from a single source to a single destination (point to point) from a single source to many destinations (point to multipoint) or from a plurality of sources to a plurality of destinations (multipoint to multipoint). Such services place heavy requirements for routing of connections supporting these services over a network.

Conventional route finding methods, such as Dijkstra's shortest path algorithm, are capable of finding a single route for a single connection (E W Dijkstra, "A Note on Two Problems in Connection with Graphs", *Numerische Mathematik* 1, pg 269, 1959). However, using a shortest path routing algorithm on a connection-by-connection basis can lead to sub-optimal or even highly congested network routing solutions. Additionally, in a telecommunications network, there are constraints other than finding the shortest route to consider. For example, it may be useful to take into account traffic flowing through the network resulting from other connections, and link and node bandwidth capacities.

In WO 96/31969 there is disclosed a method of routing traffic from a communications network which uses a genetic algorithm search routine to find optimum sets of paths between nodes in a network for routing of traffic on a point to point connection basis with the object of minimizing a number of communications channels used, and to reduce a risk of a communications system being unable to handle a high volume of traffic. A set of shortest paths forms the basis for an initial string population of the genetic algorithm.

In WO 96/31969, routes are selected according to a fitness criteria which includes a user specified weighting based on a number of channels required to support traffic, utilization of links represented as a number of links whose capacity could be exceeded, and a user specified "path cost" comprising a sum of costs of a plurality of links of a path between nodes. The user can vary the fitness criteria by altering the respective weighting given to the path cost, utilization, and number of channels in order to customize the genetic algorithm process to select for these criteria according to an importance as reflected in the user specified weightings.

However, shortest path routing cannot deal with service requests for mixed traffic data types. Further, use of shortest path routing can lead to unbalanced use of some routes or links in a network, whilst other routes and links remain under utilized.

SUMMARY OF THE INVENTION

Users of services delivered over a communications network may make service requests for connections over the network, specifying a source node and one or more destination nodes for each connection. Such connection requests need not usually specify a route of nodes and links in the network which should be taken between the source and destination nodes. Routes across the network need to be assigned to connection requests in order to implement connections.

One object of the present invention is to route connection requests in a communication network in a manner which takes into account a plurality of connection requests simultaneously rather than one connection request at a time.

Another object is to balance routing of connections across the network. For instance, if two connections would ideally include a same link in a shortest path, but this could result in either that link becoming overloaded or one of the connections needing to take a much longer route, then it may be beneficial for one or both of the connections to be routed over slightly longer routes in order to avoid network congestion, thereby resulting in a more even distribution of network link and node utilization.

Another object of the present invention is to provide a capability to include or exclude certain nodes or links from routes found for a particular connection, for example if it is known that a particular network node equipment is not working properly or for security reasons.

A further object is to provide a generic route finding means which is reusable for circuit switched communications networks using different transport protocol types.

Suitably, the generic route finder means takes a modularized embodiment capable of being installed in a network controller or network manager, and acting as a server for a plurality of other network management applications.

A further object of the present invention is to route connection requests in a communications network according to a type of traffic which is to be carried.

A further object of the present invention is to distribute traffic of a point to point service connection over a plurality of routes.

According to a first aspect of the present invention there is provided in a network comprising a plurality of nodes and links, a method of assigning a plurality of routes to a plurality of connections, each said connection having a source node and a destination node, said method comprising the steps of:

for each said connection:
    generating a plurality of routes of links; and
    selecting a route from said plurality of routes,
wherein, said process of selecting favors selection of a route comprising lightly utilized links over routes comprising heavily utilized links.

Said method preferably comprises applying an artificial intelligence technique. Suitably, the artificial intelligence technique is applied to select a set of routes to satisfy all connections, wherein the selection provides an optimized balancing of load across the network as a whole, or across selected parts of the network. Such an artificial intelligence technique preferably comprises a genetic algorithm, but may comprise simulated annealing, or a like technique.

Preferably, said method comprises the step of assigning a link cost at each said link of the network, wherein said process of selecting favors selection of routes having lower link costs over routes having higher link costs.

According to a second aspect of the present invention, there is provided in a network comprising a plurality of nodes and links, a method of assigning a plurality of routes to a plurality of connections comprising the steps:

for each connection, generating data describing a plurality of routes for said connections, each said route represented as a bit representation;

assembling a plurality of said bit representations into a bit string representing a respective route for each of a plurality of connections;

creating a population comprising a plurality of said bit strings;

modifying said population of bit strings to rearrange an order of bits within individual bit strings of said population;

for each bit string of said population, determining a utilization of each link in said network; and selecting a said bit string having a relatively more even distribution of utilization across all said links.

Preferably, said method comprises the steps of:

for each connection to be routed, generating a binary number representing an index to said list of routes between the connection's source node and its destination node; and forming a bit string from said binary numbers.

Preferably, said bit strings are manipulated using genetic algorithm operations, including the processes of reproduction, mutation, crossover and merging.

Preferably, said step of evaluating a total cost comprises the step of adding costs of traversing each link in said selected routes.

Preferably, said routes having minimum said total cost are output. A plurality of routes are found for each connection to be routed and a route cost of each of said plurality of routes preferably does not exceed a connection cost of said connection to be routed.

According to a third aspect of the present invention there is provided in a communications network comprising a plurality of nodes linked by a plurality of links, a method of finding routes of links for a plurality of communications connections, each said connection having a source node and a destination node, said method comprising the machine executable steps of:

for each connection in said network: generating a plurality of routes of links between a source node and a destination node of the connection wherein for at least one said connection, a said selected route is longer than a shortest route which satisfies said connection.

Preferably said methods are implemented by a suitably configured processor and memory.

According to a fourth aspect of the present invention, there is provided in a communications network comprising a plurality of nodes linked by a plurality of links, a method of finding routes of links for a plurality of communications connections, each said connection having a source node and a destination node, said method comprising the machine executable steps of:

assigning at least one cost to each said link., wherein said at least one cost assigned to each link is associated with a data type;

for each pair of nodes in said network, generating a plurality of routes of links;

for each said connection to be routed, selecting one of said corresponding plurality of routes between the connection's source node and its destination node;

evaluating a total cost of said selected routes for all said connections to be routed; and selecting a plurality of routes according to a said total cost.

Preferably, said method comprises the steps of: selecting one or more of said nodes and/or one or more said links to be included or excluded from said routes to be found for one or more of said connections to be routed.

According to a fifth aspect of the present invention there is provided a network management apparatus for a communications network, comprising a plurality of node elements and link elements, said network management apparatus comprising means for determining a plurality of routes across said communications network in response to a plurality of received service requests, said route determining means comprising:

network data processing means operating to receive network data describing a layout and status of a plurality of network elements, and converting said network data to a generic graph representation representing a plurality of nodes, and a plurality of links linking said nodes;

service request data processing means operating to receive a plurality of service request data, said service request data describing at least one source node and at least one destination node, said service request data processor operating to convert said service request data into a generic format; and route data processing means operating to input said generic network data and said generic service request data and to assign at least one route across said generic graph representation for each said service request data, said route finding means outputting a generic routing data describing said plurality of routes.

Said network management apparatus may comprise constraint data storage means operating to store constraint data describing a plurality of constraints on determining said routes, wherein said route finder means determines said routes in accordance with said constraint data input from said constraint data storage means.

Preferably said route data processing means comprises a data processing machine comprising a processor and data storage means.

Said route data processing means may comprise means for calculating a shortest paths across said network data.

Preferably, said network management apparatus comprises an interface interfacing said route data processing means with said service request data processing means, said network data processor, and said route data processing means, said interface comprising a data file storing data in dimensionless format.

Preferably, said data file comprises an ASCII protocol data file.

The data file preferably comprises a plurality of sections, said sections containing data describing parameters selected from the following set:

a node capacity;

a link capacity;

link utilization;

link reliability;

node reliability.

Said data file preferably comprises sections containing data describing the following parameters:

a cost associated with a link for a specified data type;

a number of routes to be taken;

a percentage of traffic to be assigned as between individual routes of a plurality of routes;

constraints on inclusion and exclusion of links;

constraints on inclusion or exclusion of nodes;

identification of a source node and at least one destination node.

Said data file preferably comprises sections containing data describing the following parameters:

data describing routing objectives;

data describing a number of iterations for running a search algorithm.

The invention includes, in a communications network comprising a plurality of nodes linked by a plurality of links, a method of finding a plurality of routes of links for a plurality of communications connections, each said connection having a source node and a destination node pair, said method comprising the machine executable steps of:

assigning at least one link cost to each said link;

assigning a connection cost for each said connection to be routed;

for a plurality of said source-destination node pairs in said network, generating a list of a plurality of route of links, said listed route having minimum associated route costs;

for each said connection to be routed, selecting one of said listed routes between the connection's source node and its destination node; and evaluating a total route cost of said selected routes for all said connections to be routed.

For each connection, by generating a list of possible routes for that connection, and selecting one of the routes being not necessarily a shortest route, balancing of loading over a network may be achieved.

Preferably, said method comprises the steps of:

for each connection to be routed, generating a binary number representing an index to said list of routes between the connection's source node and its destination node; and forming a bit string from said binary numbers.

Preferably, said bit string is manipulated using genetic algorithm operations, including reproduction, mutation, crossover and merging.

Said step of evaluating a total cost may comprise the step of:

adding costs of traversing each link in said selected routes.

Preferably, said routes with minimum said total cost are output.

Preferably, a plurality of routes are found for each said connection to be routed, said route cost of each of said plurality of routes not exceeding said connection cost of said connection to be routed.

The apparatus may comprise a processor and memory configured to execute a method according to the above aspects.

The invention includes a communications network configured by a method according to the above aspects.

The invention includes in a network comprising a plurality of nodes linked by a plurality of links, a method of finding routes of links for a plurality of communications connections, each said connection having a source node and a destination node, said method comprising the machine executable steps of:

assigning at least one cost to each said link, wherein said at least one cost assigned to each link is associated with a data type;

assigning a connection cost for each said connection to be routed;

for each pair of nodes in said network, generating a list of routes of links, said listed routes having minimum associated costs;

for each said connection to be routed, selecting one of said listed routes between the connection's source node and its destination node; and evaluating a total cost of said selected routes for all said connections to be routed.

The invention includes in a communications network comprising a plurality of nodes linked by a plurality of links, a method of finding routes of links for a plurality of communications connections, each said connection having a source node and a destination node, said method comprising the machine executable steps of:

assigning at least one cost to each said link;

assigning a connection cost for each said connection to be routed;

for each pair of nodes in said network, generating a list of routes of links, said listed routes having minimum associated costs;

for each said connection to be routed, selecting one of said listed routes between the connection's source node and its destination node;

evaluating a total cost of said selected routes for all said connections to be routed; and selecting one or more of said nodes and/or one or more said links to be included or excluded from said routes to be found for one or more of said connections to be routed.

Methods for routing of connections according to the present invention may have application in network design. Simulating a number of connections can identify any unnecessary links in the network, eg links which are used lightly or not at all. Important links in the network may also be identified by applying conventional routing algorithms and techniques, for example heavily loaded links or links which are potential bottlenecks.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 12 illustrates the contents of a text file which may be entered into the route finder engine, possibly from the data editors shown in FIG. 10 and FIG. 11;

FIG. 15 illustrates an example of a file which may be entered into the route finder, possibly produced by the data editors shown in FIG. 13 and FIG. 14;

FIG. 16 illustrates an example of a file which may be entered into the route finder defining evaluation function related parameters;

FIG. 22 illustrates an example of an output file produced by the route finder engine;

Detailed Description of the Best Mode for Carrying Out the Invention

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
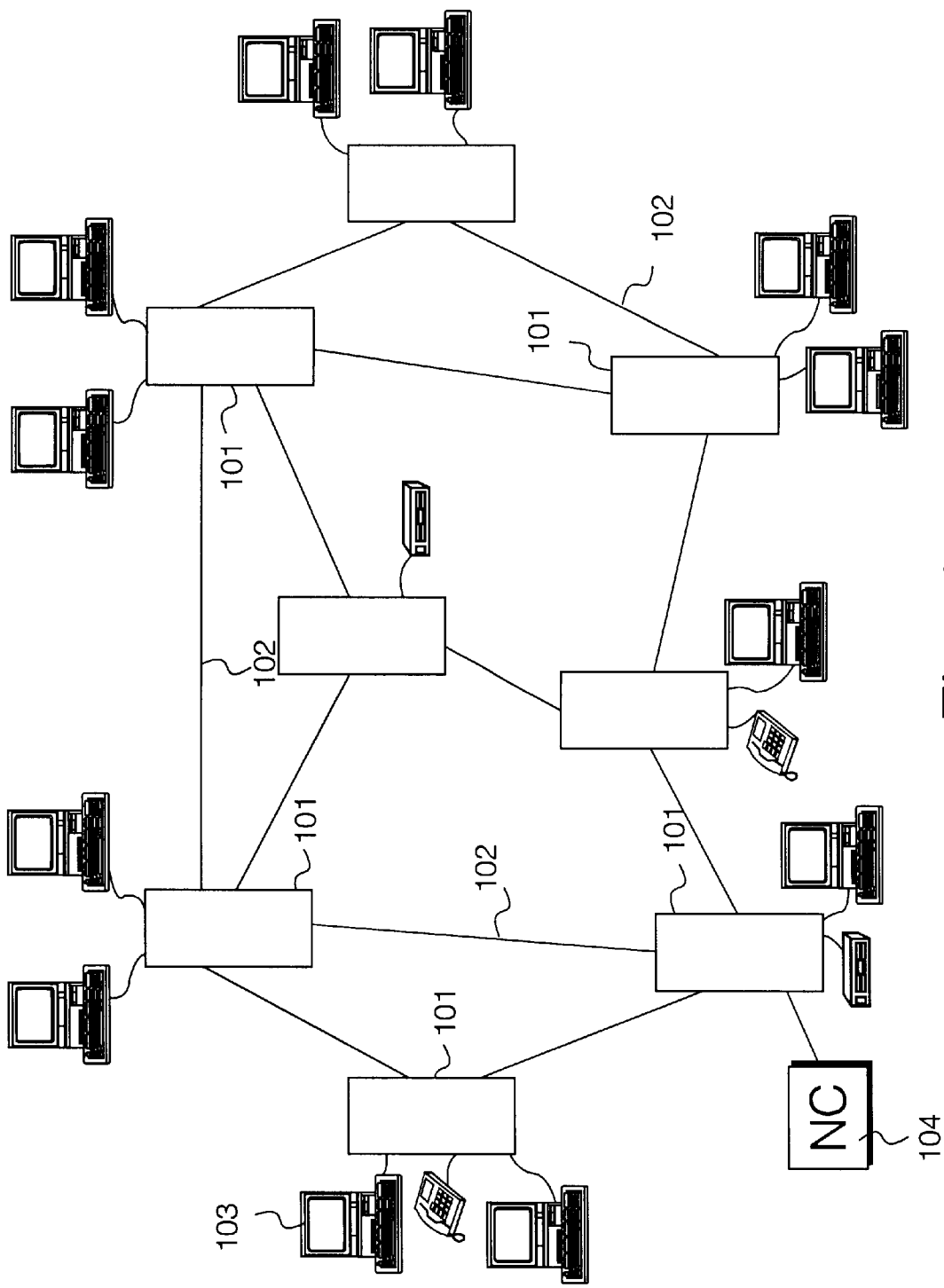
FIG. 1 illustrates schematically a broadband communications network including a plurality of node equipment, a plurality of link equipment and a network controller.

Referring to FIG. 1 herein there is shown schematically a circuit switched communications network comprising a plurality of node elements each comprising an item of node equipment for example a switch, and a plurality of link elements, connecting the node elements, each link element comprising an item of link equipment, eg terrestrial or wireless communication links. Each item of node equipment may comprise a plurality of individual physical components. Each item of link equipment may comprise one or a plurality of physical components. Each link equipment may support a plurality of communication channels.

The communications network may include mobile phone communications apparatus resident at one or more nodes of the network and a node element may comprise a gateway to another network, for example a world wide web gateway.

In general, the communications network will comprise a variety of different types of node equipment and a variety of different types of link equipment, made by different manufacturers and having differing performance specifications. In FIG. 1, traffic data signals are transmitted along the link equipment and through the node equipment over a circuit switched path between a source node element and a destination node element. The traffic data is carried between sources and destinations over a plurality of routes across the network.

A network controller 104 may be attached to a node equipment, the network controller comprising management functionality for managing routes or connections across the network. In the best mode herein, the network controller comprises a modular route finder component which acts as a server for finding routes for connections in response to service requests generated by a plurality of different network management applications. The route finder component may support other network management applications resident on the network controller, for example the route finder component may support network topology design for synchronous digital hierarchy (SDH)/synchronous optical network (SONET) rings, or network design and bandwidth provisioning.

Figure 2:
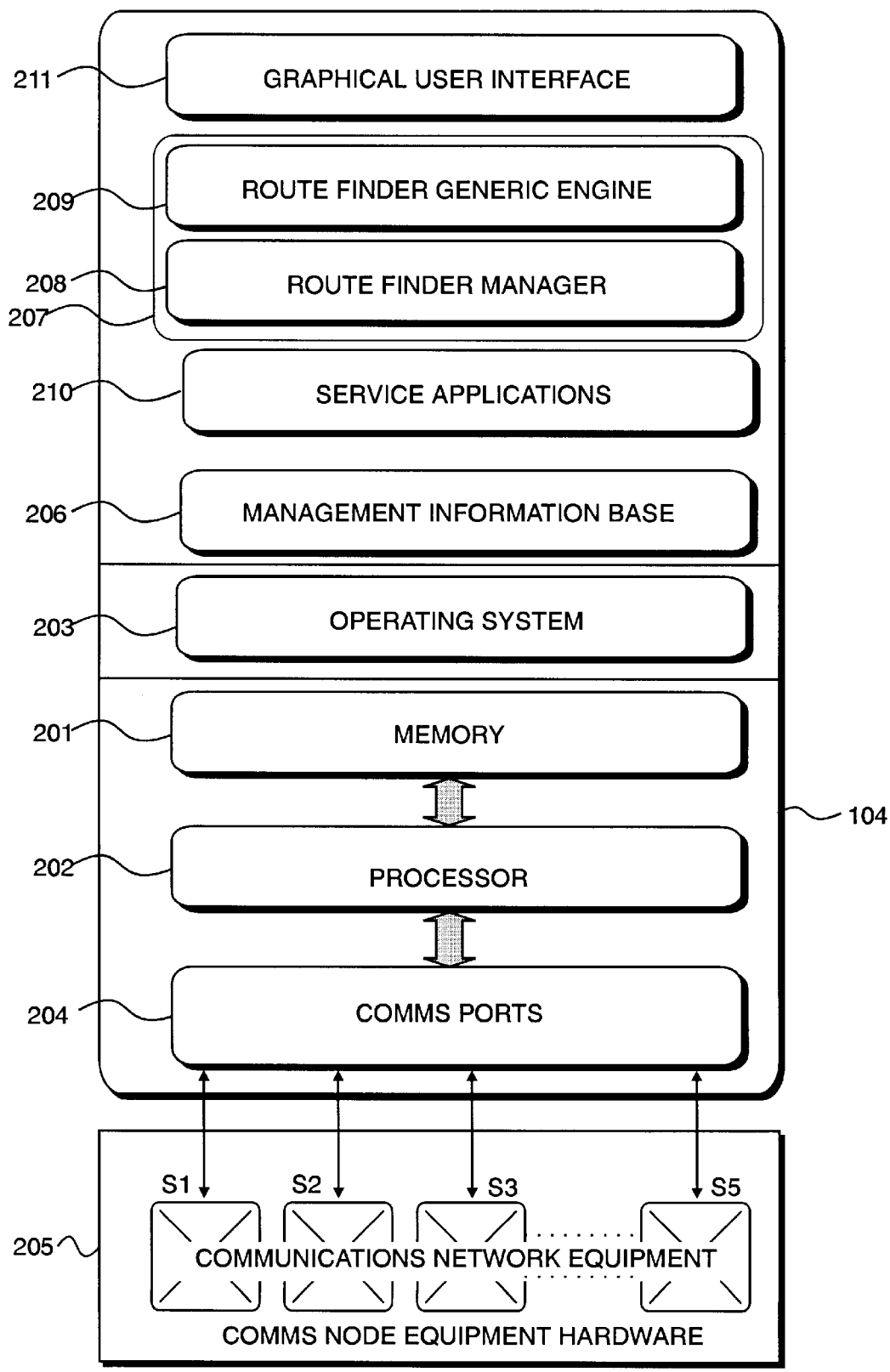
FIG. 2 illustrates schematically an architecture of the network controller identified in FIG. 1 including a route finder component.

FIG. 2 of the accompanying drawings illustrates a schematic diagram of one embodiment of a network controller 104. The network controller comprises a general purpose computer, such as a Hewlett Packard 9000 series work station, comprising a memory 201; a processor 202; an operating system 203; a plurality of communications ports 204 through which data is transferred to and from communications node equipment hardware 205; a management information base (MIB) 206 holding data describing physical resources of a network, eg node equipment type, link bitrate capacity; route finder component 207 for routing service requests across the network, the route finder component comprising a route finder manager 208 and a route finder engine 209, the route finder manager comprising one or a plurality of pre-processing components for pre-processing data prior to input to the route finder engine 209, and one or a plurality or post-processors for processing data after output from the route finder engine; a plurality of network management applications 210 for managing services over the networks, and a graphical user interface 211 for enabling an operator to monitor operation of the route finder component and to input data to the network controller.

Differences exist between different telecommunications systems. Different types of communications network, for example asynchronous transfer mode (ATM) or synchronous digital hierarchy (SDH) networks, have different technical properties but at a simple level each can be represented as a graph of nodes and links. According to the best mode herein, such differences may be resolved to enable use of a generic routing module suitable for a range of telecommunications systems by:

- explicitly catering for instances within a generic route finding means and invoking specified routing strategies via the use of parameters
- providing a "mapping" to and from a generic routing model to a specific network system's requirements, constraints and limitations.

The route finder component 207 may not provide a real time routing mechanism, but operates to develop and optimize routing strategies across the network in response to a plurality of service requests generated by the other network service applications 210. The routing strategies produced by the route finder component 207 are used to produce routing tables for use by conventional real time routing applications within the network.

An overview of a generic routing problem which is addressed by the route finder component is now illustrated with reference to FIG. 3 herein which illustrates an example of a generic representation of a communications network, eg as illustrated in FIG. 1. The generic network representation is viewed as a topology graph comprising a plurality of nodes 301 connected by a plurality of links 302. Any node element equipment can be represented by a node 301. Any link equipment can be represented by a link 302 between two nodes. The links can be unidirectional or bidirectional, depending on whether messages can be transmitted across the link in one or two directions respectively at any given time. Each node and link has a pre-determined finite bitrate transmission capacity.

Network service applications running on the network controller or other workstations connected to the network may make a number of service requests which need to be implemented as connections between particular nodes. A service request can give rise to one or a plurality of connection requests. Each connection request results in requests for source to destination connections which must be routed across the network, in order to carry data traffic comprising the requested service. The service requests may specify the type of data traffic to be transferred, eg data or voice, a source node and one or more destination nodes.

In this specification the term "connection" means a circuit switched allocation of physical resources between a source node and one or more destination nodes. In this specification, a "route" is defined as a path across one or a plurality of links, between a source node and a destination node. There may be several routes available for each pair of source/destination nodes.

In a preferred embodiment service requests are received by the route finder component 207 which can assign routes to requested connections according to specific criteria such as avoiding overloading any specified link or node or attempting to utilize as many nodes/links in the network as possible at a given time. Each link is assigned an associated cost, denoted by numerals C1–C12 near the center of the link lines 302 in the general topology view of FIG. 3.

Assignment of costs to links for a network is user specifiable. All costs can be uniform through the network or complex costs can be attached to links, for example relating to link utilization by connections. The costs can also be variable for different traffic types, for example resulting from voice or data connections. The route finder component operates to find routes having the minimum overall costs for connections to be routed between nodes in the network and thereby find routes which for example experience lower delay, or have faster, more reliable transmission.

Figure 4:
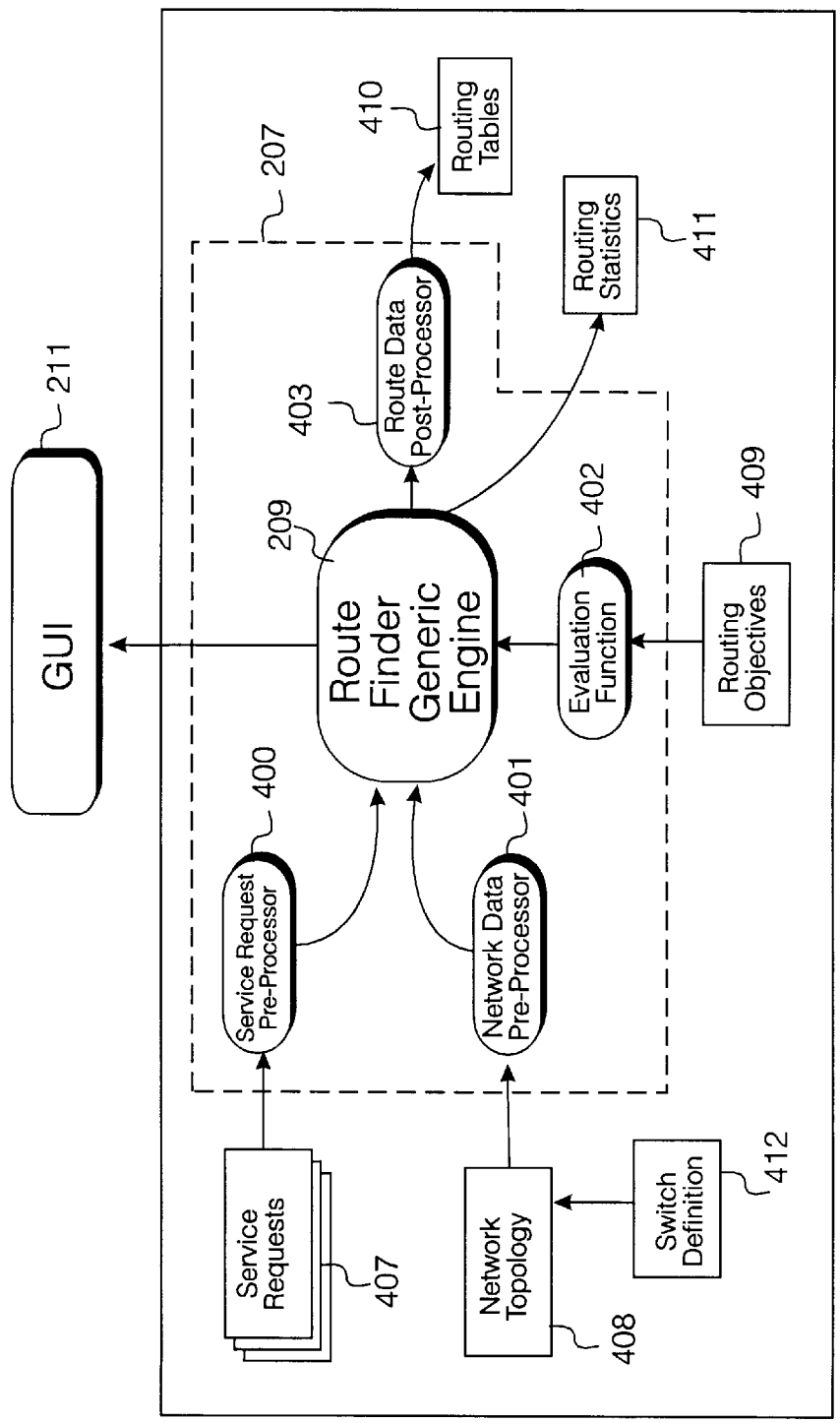
FIG. 4 illustrates an architecture of the route finder component identified in FIG. 3, including a service request pre-processor, a network data pre-processor, a route finder engine, an evaluation function processor, a graphical user interface, a route data post processor, and data inputs and outputs associated with the route finder component.

FIG. 4 of the accompanying drawings illustrates a schematic diagram of a high level architecture of the route finder component 207 and associated input and output data operated on by the route finder component. The route finder engine 209 preferably comprises a memory, and a processor executing one or more route finding algorithms. The route finder manager 208 comprises a service request pre-processor 400; a network data pre-processor 401; an evaluation function processor 402; and a route data post-processor 303. Each of the service request pre-processor, network data pre-processor, evaluation function processor and route data post-processor may comprise a processor element and an area of data storage device configured by means of algorithms for carrying out data traffic pre-processing, network data pre-processing, evaluation functions and route data post-processing respectively.

External network management applications including service management applications send service requests to the route finder manager 208 and the route finder manager responds by returning a routing strategy for implementing those services. The routing strategy is produced in the form of routing table data 410. The route finder engine 209 receives input data from service request pre-processor 400, network data pre-processor 401 and evaluation function processor 402, and outputs data to route data post-processor 403. The pre-processors 400, 401 and 402 are configured to convert data from external management applications into a generic form suitable for input into route finder engine 209. The route finder engine can also transfer data to and from a graphical user interface (GUI) 211 allowing an operator to obtain a visual display view of connections and routes taken by connections which are assigned or to be assigned by the route finder engine 209.

The service request pre-processor and network data pre-processor input service request data, network topology data and switch definition data in an implementation specific format and convert this data into a format which is generic and not specific to any proprietary equipment types or transport protocols. In the best mode herein, the service request pre-processor 400, network data pre-processor 401 produce data files split into separate sections, each identified by a keyword. Each keyword describes a feature of the network topology or the service requests. The data file is provided in standard ASCII format, and the information described under each keyword is input in a generic format, without specifying units of measurement. The route finder engine 209 operates on the generic data produced by the pre-processors to produce generic output data, which is operated on by route data post-processor 403 prior to storing on the MIB.

The service request pre-processor, network data pre-processor and route data post-processor are implemented as product specific components, that is to say, are configured to a type of node equipment, eg switch, MIB etc which is proprietary, and may be customized in each installation. However, the route finder engine 401 and evaluation processor 404 are generic and re-usable from installation to installation.

The service requests 407, network topology data 408, switch definition data 412, routing objective data 409, routing tables 410 and routing statistics 411 may be stored on management information base 206 and are accessible to a plurality of other network management applications resident on the network controller, or elsewhere on the network. Data stored on the management information base may be specific to particular proprietary network elements, and may be specific to particular transport mechanisms, eg ATM, SDH, SONET.

Service request pre-processor 400 receives input service request data in the from of a list of service requests 407 from an external application. Typically, a service request may specify:

- a traffic data type, eg voice, video, computer generated data
- a source node and one or a plurality of destination nodes
- a required bitrate capacity (either peak or average) between the source nodes and each destination node
- acceptable cell loss and delay thresholds
- a time and duration when transmission of the traffic data is required.
- a number of routes and a splitting of traffic data between those routes The service request pre-processor 400 converts the service requests 407 into a generic data format suitable for input to the route finder engine 209. The input service request data 407 may be specific to individual switch types, or transport protocol types. Service request pre-processor 400 converts the service request data to produce a traffic matrix data for each traffic type. These matrices are transformed into generic service requests by service request pre-processor 400, which are input into route finder component 207 to be routed across the network.

The network data pre-processor 401 receives input data describing the network 408 from Management Information Base 206. The network data describes connectivity and topology of nodes and links of the network. The network data may contain switch definition data 412 which describes network node elements' characteristics such as bandwidth capacity. The network topology data may include:

- node names, their bitrate capacities (peak or average) and their cell processing times
- link names, their bitrate capacities (peak or average) and costs for each traffic type to be routed
- link status data describing an amount of bitrate capacity already consumed by existing service requests
- node status data describing an amount of bitrate capacity already consumed by existing service requests The network data pre-processor 403 converts the input network data into a generic form suitable for the route finder component 207. Network data pre-processor 403 receives the network data 408 including switch definition data 412, which may be in a form specific to individual proprietary switches and link equipment, and generates generic network graph data which is input into route finder generic engine 209. Since the network data 408 includes switch specific information, such switch specific information is converted to generic format by network data pre-processor 401. An example of a switch specific information is a bitrate capacity of a switch.

Evaluation function processor 402 receives a representation of routing objectives data 409 entered by a user. The evaluation function processor 402 is used by the route finder engine's genetic algorithms to quantify efficiency/fitness of a particular set of routes found for the service requests it receives. Evaluation function pre-processor 402 receives routing objective data 409 describing high level routing objectives specified by a network operator. Such high level routing objectives may comprise data describing constraints on routing. The evaluation function pre-processor 402 assigns a fitness data to potential routing strategies specified in the routing objective data 409. The assigned fitnesses are used by the route finder engine in searching for potential routes across the network.

The route finder engine 209 produces route data describing a list of routes for the service requests. The output route data is transferred to route data post-processor 403 which converts the route data into a routing table 410. The route finder engine 209 produces route data in generic format for each node in the network. The route data post processor 403 converts the generic format route data into a product specific routing table form usable by the network switches. The routing table data is accessible by a connection control component of the node equipment switches for implementing the connections. The route finder engine 209 also outputs routing statistics data 411. A user can view and evaluate the routes found by the route finding component by inspection of the routing statistics data 411 stored on the MIB 206.

Routing statistics data 411 may include data describing
- utilization of the network, both in terms of utilization of links, switches and overall utilization after satisfaction of service requests
- differences in a state of the network from a state under previous routing strategies
- distribution of traffic across computed routes The route finder engine 209 is configured to operate on generic network data produced by the service request pre-processor 400, network data pre-processor 401, and evaluation function processor 402. The route finder engine 209 operates according to an algorithm which performs an artificial intelligence search technique. In the best mode herein, the route finder engine operates a genetic algorithm, although as an alternative, a simulated annealing algorithm, or a combination of a genetic algorithm and a simulated annealing algorithm may be applied by the search engine. In the best mode described herein, a genetic algorithm implementation is described, using the known GAmeter tool kit ("The GAmeter Tool Kit" J Mann, A Kapsalis, and G D Smith; in Applications in Modern Heuristic Techniques, V J Rayward-Smith (Editor) Chapter 12 pp 195–209, Alfred Waller 1995).

By structuring the route finder component 207 into the manager component 208 and generic route finder engine 209, the search algorithms of the route finder engine component can operate without using any problem specific knowledge. The search algorithm optimizes its search for routes according to fitness data produced by evaluation function processor 402. By separating the search engine from the evaluation criteria produced by evaluation function processor 402, modularization and generality may be achieved, thereby allowing improvements to be made to the search algorithm independently of service request pre-processor 400, network data pre-processor 403, or evaluation function processor 402.

Figure 5:
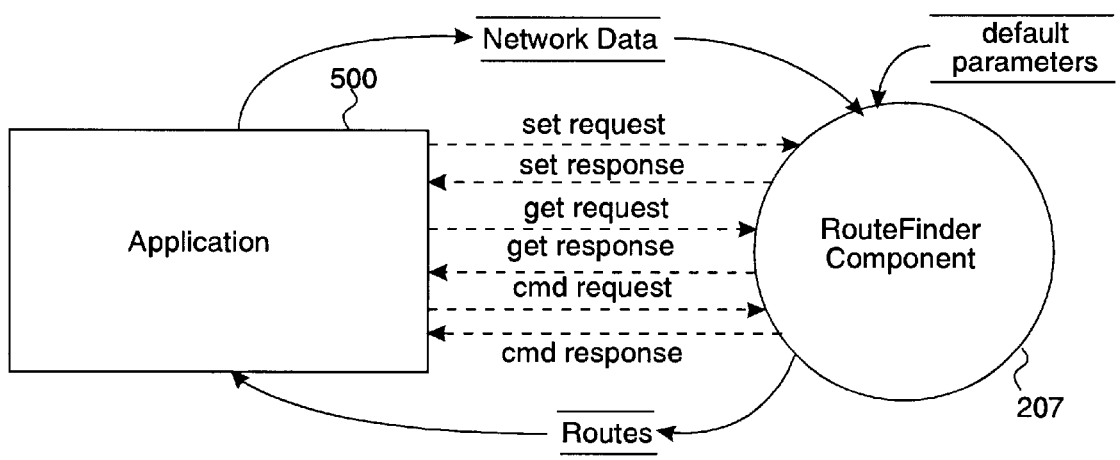
FIG. 5 illustrates schematically interaction of the route finder engine with a network management application.

FIG. 5 herein illustrates schematically route finder component 207 and examples of interactions with a network management application 500. The network management application 500 communicates with the route finder component 207 by a series of set, get and command signals (set request, set response, get request, get response, command request, command response) as illustrated in FIG. 5. Network data is passed from the management application to the route finder component, enabling the route finder component to gain knowledge of the network across which the network management application requests to deploy a service. The route finder component 207 finds an optimized set of routes for carrying the service, and returns data describing those routes to the management application 500 in the form of routing table data 410. The route finder component 207 determines the optimum routes in accordance with a set of default parameters. The default parameters are stored in the route finder component 207 and the management application 500 or a user may update, query or change the default parameters by means of the command request signals.

In the following description, a genetic algorithm implementation of route finder component 207 will be described. It will be understood that in other embodiments of the invention, the genetic algorithm search engine may be replaced by other artificial intelligence technique search engines, for example a simulated annealing search engine, or a combination of a genetic algorithm search engine and a simulated annealing search engine.

Whilst the following description of a best mode apparatus and method includes elements suitable for routing point to multipoint connections, details of which are disclosed in the inventors and applicant's unpublished co-pending United Kingdom patent application GB 97 27163.9 filed Dec. 24, 1997, a copy of which is filed herewith, the present disclosure is concerned primarily with operation of the generic route finder means and method with respect to routing of a plurality of point to point connections. It will be understood that the method of routing point to point connections may co-exist with a point to multi-point routing method and may optionally, but not essentially operate in parallel with such method.

Figure 6:
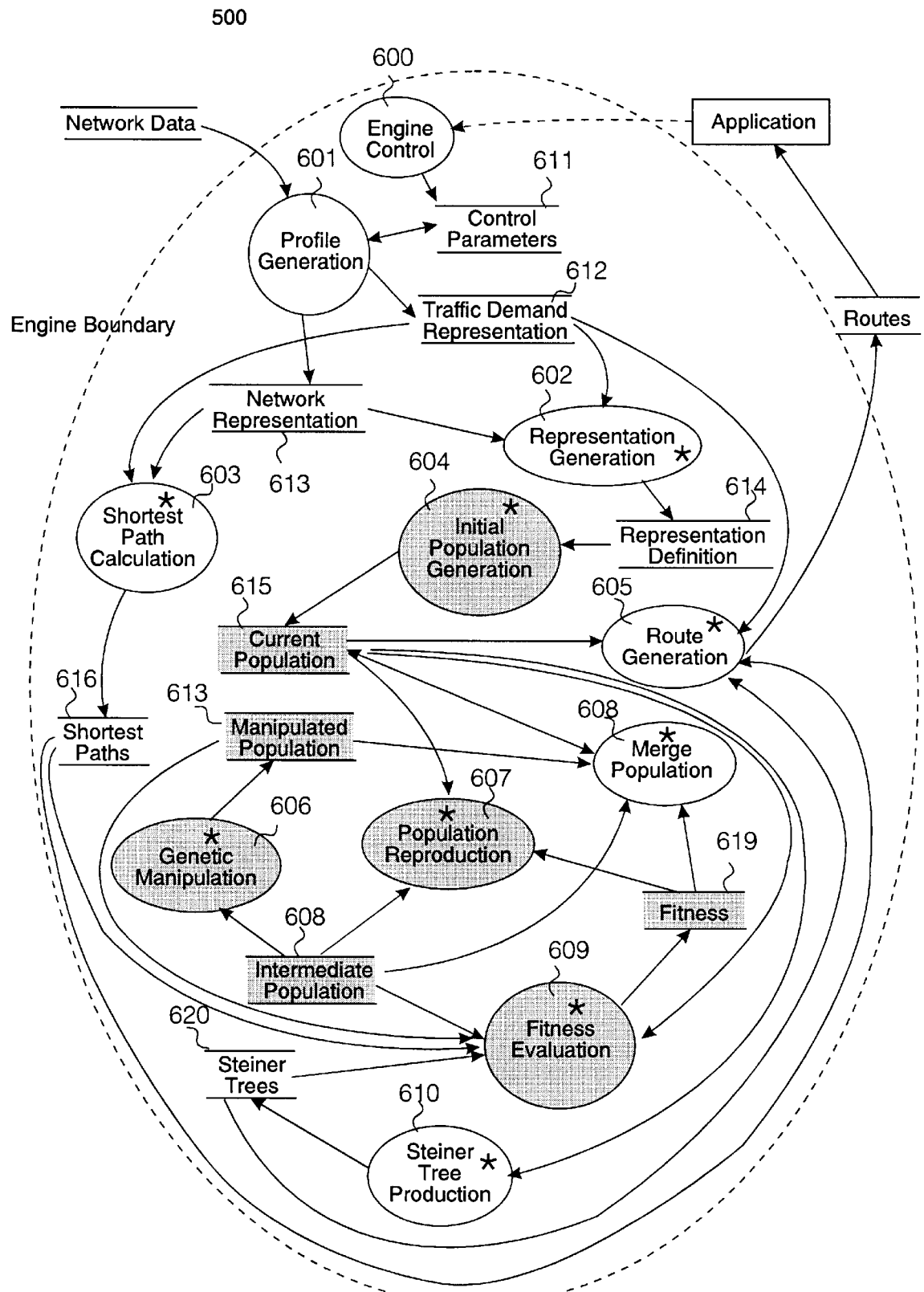
FIG. 6 illustrates a data flow diagram showing schematically flows of data and data processing operations within the route finder engine.

Referring to FIG. 6 herein, there is illustrated a data flow diagram of data within route finder component 207. The route finder component 207 comprises a plurality of data processing elements, each comprising a processor and an associated area of memory device carrying out specific processes as illustrated schematically in FIG. 6. Data is transferred between processors as indicated in FIG. 6 herein. The symbol * associated with several of the processes in FIG. 6 indicates that there is a data flow from control parameters data 612 to shortest path calculation process 603, initial population generation process 604, route generation process 605, genetic manipulation process 606, population reproduction process 607, merge population process 608, fitness evaluation process 402, and Steiner Tree production process 610. The functions of each of the process are as follows. Engine control processor 600 controls invocation of all other processes within the route finder generic engine 209. Profile generation process 601 reads a data file containing data describing network topology and traffic demand information and processes it into an internal representation of the network and of traffic demands, both point to point and point to multipoint, placed upon the network by an application. A network data file output from network data pre-processor 401 is input into profile generator process 601. Control parameter data 611 describing parameters such as form example weighting co-efficients associated with a fitness evaluation process 609 carried out by evaluation function processor 402 is also input into profile generation process 601. Representation generation process 602 operates on traffic demand representation data 612, network representation data 613 output from profile generation process 601 and selected control parameter data 611 to compute a number of bits which are required by the genetic algorithm to represent a routing decision space, from which generic routing solutions will be found.

Network representation data 613 stores two "views" of the network. Firstly, a graph view of the network on which algorithms, eg k shortest path algorithm or minimum spanning tree algorithms can be run is stored in the network representation data 613. Secondly, a view of the network which allows a mapping to external node and link names is stored. This view is generated during network data parsing, and is used principally during production of routes. The information stored for the network representation data 613 includes: locations; links; link costs; graphs. Locations have the attributes: geographical position; name; capacity, ie the amount of traffic which can flow through a node.

Links have the following attributes: link identifier; source node and port number; destination node and port number; capacity; current load, ie a load before traffic requests a routed; total load, ie a load after traffic requests are routed;

Link costs have the attributes: link identifier; cost routing;

Link cost information is stored for all traffic types in the traffic demands which require routing. Graphs have the following attributes: number of nodes; degrees of each vertex.

Shortest path calculation process 603 operates a known Yen-Lawler algorithm on the network representation data 613 and traffic demand representation data 612 and outputs the shortest path data 616 comprising an integer number k shortest paths for each service request 407 input to the route finder component 207. A genetic algorithm search routine is implemented by initial population generation processor 604, genetic manipulation processor 606, population reproduction processor 607, merge population processor 608, and fitness evaluation processor 609. In general, genetic algorithm processes are well known in the prior art and involve representing a problem as a series of bits or bytes of data in fixed length bit strings. Populations of fixed length bit strings are altered, combined, mutated and crossed over with each other and optimized bit strings are selected in accordance with a fitness criteria. In the best mode herein, routes across a network of nodes and links are represented by bit strings of ones and zeros, which are mutated and combined to find optimum routes in accordance with routing objectives 409 input into a fitness evaluation function operated by evaluation function processor 402. Initial population generation processor 604 operating part of the genetic algorithm, computes a size of a routing decision space from which routes are to be found and produces an initial population of string data representing routes across the network. By size of a decision space, it is meant a number of possible different routes (each represented by a corresponding respective string). The strings in the initial population describe randomly assigned routes across the network. Optionally, an initial string population in which all shortest paths across the network have been assigned may be generated. In generating the initial population of strings, initial population generation process 604 inputs representation definition data 614 generated by representation generation process 602, and operates in accordance with various control parameters specified in the control parameter data 611. A current population of strings represented by current population data 615 is input into population reproduction process 607. Population reproduction process 607 takes the current population and reproduces the population of strings based upon the values of several control parameters specified in control parameter data 611, and in proportion to a "fitness" of the individual strings of the population of strings, to produce an intermediate population of strings represented by intermediate population data 618. The fitness criteria are specified in fitness data 619, which are input into population reproduction process 607. Genetic manipulation process 606 inputs the intermediate population data comprising an intermediate population of strings, applies known mutation and cross over process and thereby generates a manipulated population of strings. This process mixes the strings contained in the intermediate population. The current population, intermediate population and manipulated population are merged by merge population process 608, according to parameters specified in control parameter data 611 and according to fitness values of each member of the population as determined by fitness evaluation process 609 outputting fitness data 619. The fitness evaluation process 609 inputs data strings comprising population members from the current, intermediate and manipulated population data, decodes them and simulates routing of traffic using the network representation data based on the current, intermediate and manipulated population members. A fitness function is evaluated according to control parameters specified in control parameter data 611 as will be described hereinafter. A fitness value for each population member is generated. Each point to point connection request corresponds to a source node and a destination node. For each source-destination node pair a plurality of routes of links are determined using a known algorithm, eg the known Yen-Lawler algorithm. For each source-destination node pair, a set of (for example 8) shortest routes are stored in a look-up table, and the 8 shortest routes are converted to bit string representations to form bit string population members which are manipulated according to genetic manipulation process 606. Route generation process 605 periodically selects optimum population member strings from the current population, with a period which may be specified by the user in control parameter data 611, and decodes the strings into routing information for point to point and point to multipoint service requests. This information is printed as text information and is available to a user via graphical user interface 211.

There will now be described further detail of how the route finder component 207 is controlled by an external network management application 500. As described with reference to FIG. 5, an external network management application sends commands to the route finder component 207 such as get, set, execute or command, and arguments of these commands control execution of the route finder component 207. The get and set commands allow general interaction with control parameter data 611 under control of engine control process 600. The Command instruction causes the search engine to begin a search for optimal routes. The genetic algorithm search engine interacts with the representation generation process 602 and shortest path calculation process 603 in order to compute the size of string representation required (in bits) and compute paths for each point to point traffic demand from which routes will be chosen.

The representation generation process and shortest path calculation processor are pre-processing steps in the route selection process. Each time the management application 500 requests a set of new routing solutions, the representation generation process and shortest path calculation process are operated in an initialization phase prior to operation of the search for routes.

For each search carried out by the genetic algorithm search engine, following the initialization phase, a cycle of processes is involved. The following example refers to the genetic algorithm implementation presented as the best mode herein. A current population of data strings generated by initial population generation process 604 is input as current population data 615 into fitness evaluation process 609. Fitness evaluation process 609 generates fitness data 619 corresponding to the current population of strings. The fitness data and current population data is used by the population reproduction process to generate an intermediate population of strings output as intermediate population data 618. Each string of the intermediate population has its fitness evaluated by fitness evaluation process 609 resulting in fitness data 619 describing a fitness value for each string comprising the intermediate population of strings. The manipulated population of strings represented by manipulated population data 617 has its fitness evaluated by fitness evaluation process 609 resulting in fitness data 619 representing a fitness of each string of the manipulated population. Data describing the three populations of strings, ie the current population, intermediate population and manipulated population, along with fitness value data corresponding to each string of the current, intermediate and manipulated populations are input to the merge population process 608 which generates a new current population of strings represented by current population data 615 based upon selection of fittest strings from each of the current, intermediate and manipulated populations. The cycle completes by route generation process 605 computing a plurality of routes based upon one or more fittest strings of the current population, and returning these computed routes to network management application 500 as routing tables 400, after first converting the output route data to a form suitable for input to the management application 500 in route data post-processor 403. Generation of new routes is conditional upon control parameters stored in control parameter data 611, specified by network management application 500. The generation of new route data terminates when population reproduction processor 607 determines that a predetermined number of evaluations specified in the control parameters data 611 have been performed. The route finder component 207 then waits for further commands from the network management application 500 before generating further route table data.

In the above process, fitness evaluation process 609 uses shortest path data and Steiner Tree data to accord a fitness parameter to the string members of the populations. Whilst shortest path information is generated only once in response to a request for routing from the network management application 500, Steiner Tree data is generated for each member of each population. Thus, Steiner Tree production is invoked for a point to multipoint service request.

Referring again to FIG. 4 herein, interfacing between the service request pre-processor 400, network data pre-processor 401, evaluation function pre-processor 402, route data post-processor 403 and route finder engine 209 is made by way of reading and writing data from a plurality of results data files, which are written in simple ASCII protocol.

Figure 7:
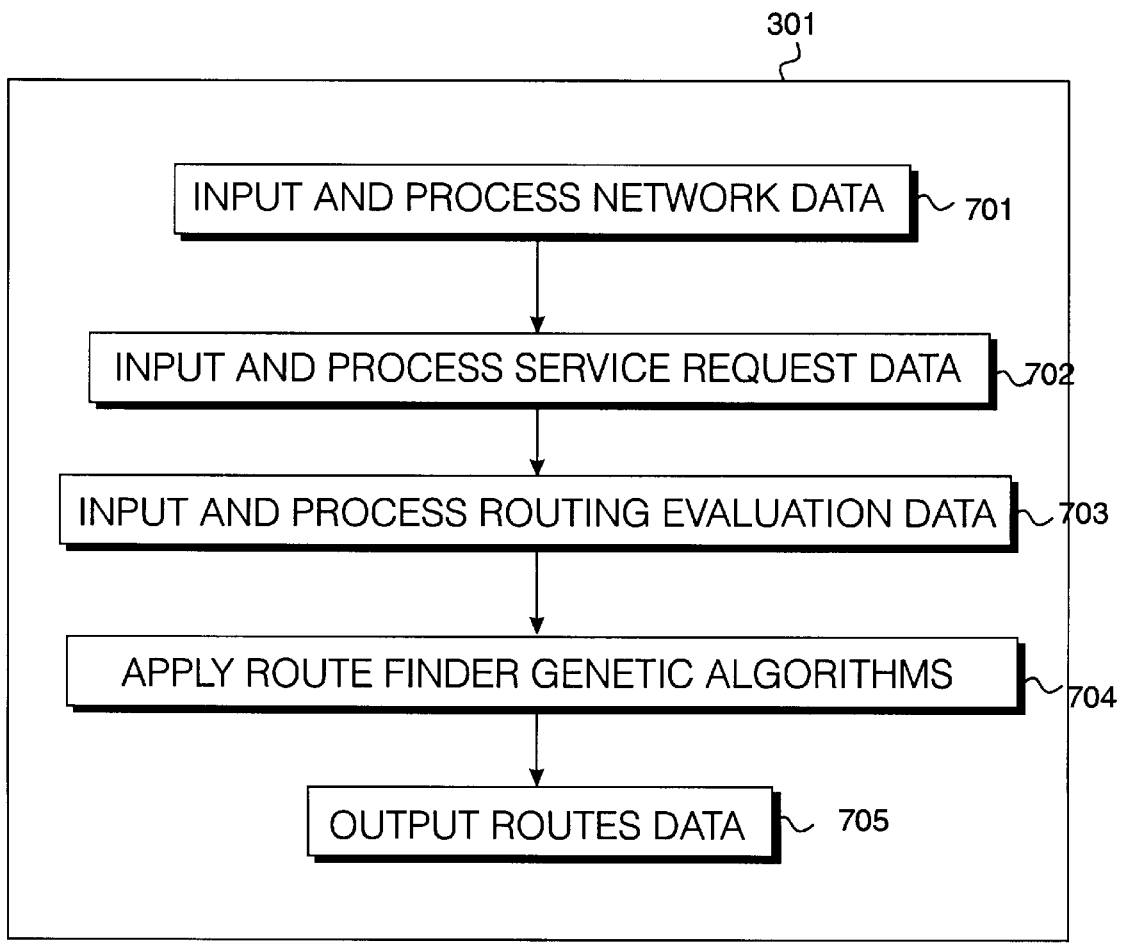
FIG. 7 illustrates schematically steps executed by the route finder component identified in FIG. 3.

FIG. 7 herein illustrates steps executed by the route finder component 207. At step 701 data describing service requests 407 is entered into service request pre-processor 400 which produces a Simple ASCII Protocol (SAP) file describing the service requests which is entered into the route finder engine 209. At step 702 network topology data 408 is entered into network data pre-processor 401 which outputs a SAP file describing relationships between nodes and links in the network. The SAP file is entered into the route finder engine 209. At step 703 a SAP text file containing data representing routing objectives 409 input by a user is entered into the route finder engine 209. At step 704 the route finder engine 209 preferably uses genetic algorithms to route the service requests it receives as input on the network described in its input according to the entered routing objective data 409 evaluation function. At step 705 the route finder engine 209 outputs a SAP file containing a list of routes for the connection requests. The SAP file may be entered into the route data post-processor 405 at step 705 in order to convert the route data SAP file into a form suitable for use by the external application which made the service requests.

A set of routing strategies carried out by route finder component 207 will now be described. To aid understanding the operations are described as operations on single node and link network graph representations as shown schematically FIGS. 8 and 9 herein. It will be understood that the graphs shown and the routes selected are implemented as machine executable data processing operations on data representing nodes and links of a network.

Figure 3:
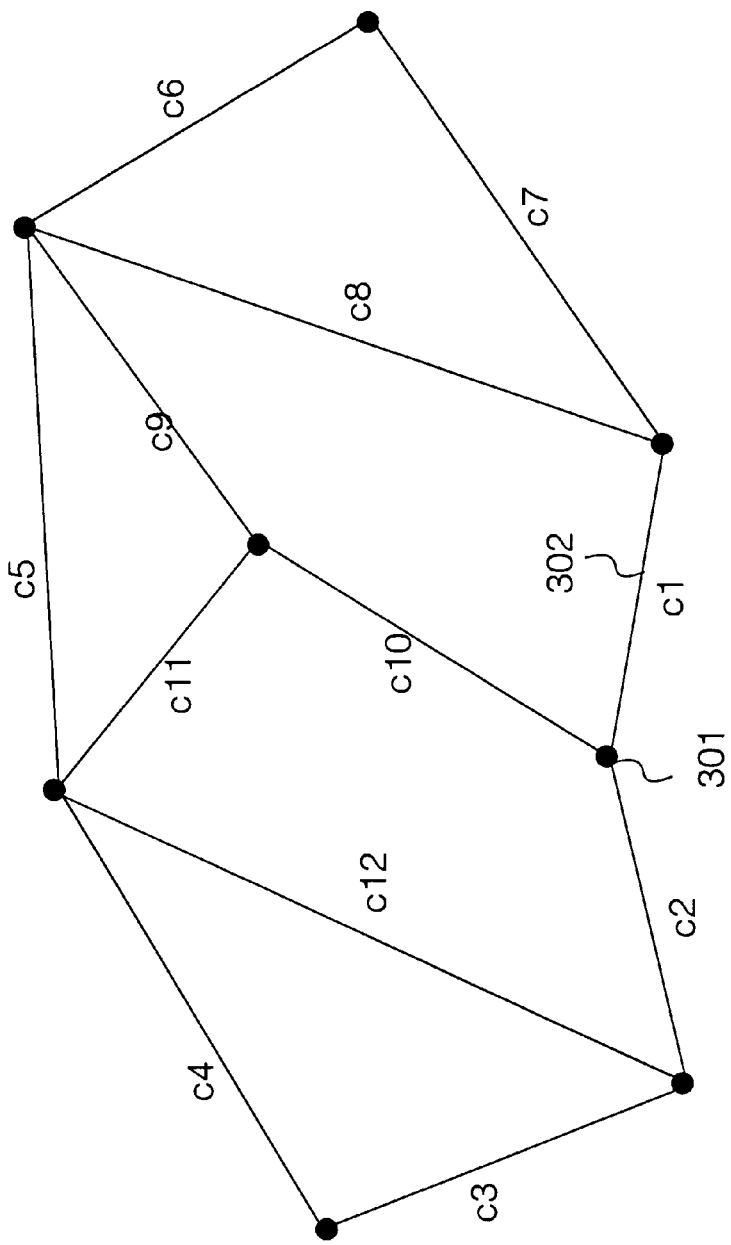
FIG. 3 illustrates schematically a generic representation of a topology of the network shown in FIG. 1, reduced to a plurality of nodes and links.
Figure 8:
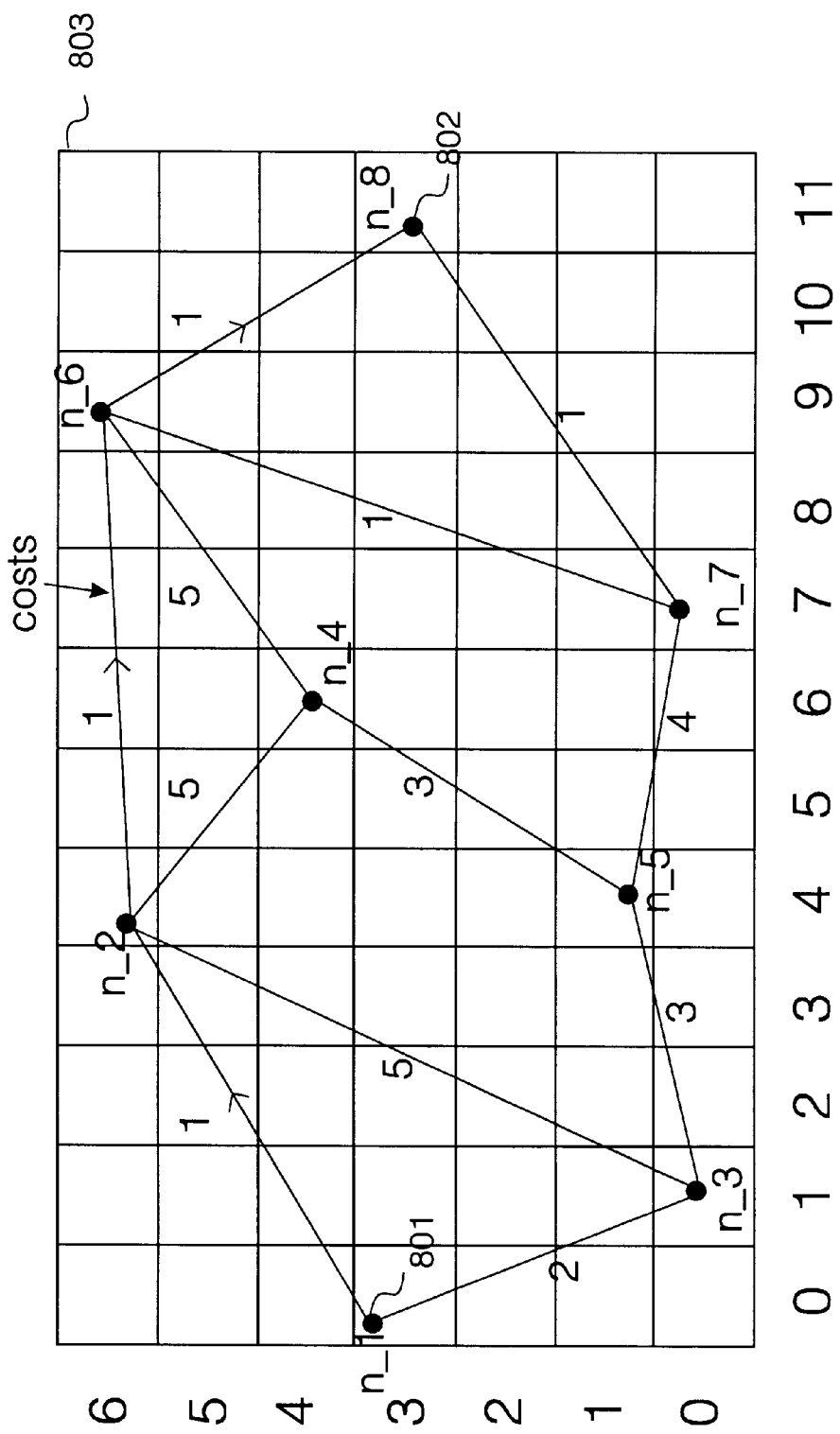
FIG. 8 illustrates the generic representation of a network identified in FIG. 3 combined with elements used by the route finder.

FIG. 8 of the accompanying drawings illustrates the generic network graph of nodes and links illustrated in FIG. 3. A grid of coordinates 803 is superimposed upon the network graph, such that each node is assigned a unique XY coordinate position. Links between nodes are assigned associated costs, (denoted in FIG. 8 by numerals near the center of the link lines).

Each link in the generic network graph is assigned a link cost. Link cost information is specified in connection requests of the request for services which require to be routed. A cost of a single link may be different for different traffic data types. For each route of a connection, a route cost comprises a summation of links included in that route. A connection cost comprises a summation of all route costs for all routes in a connection for a particular service request.

An example of a route chosen by the route finder for a connection between a source node 801, labeled n_1 and a destination node 802 labeled n_8 is indicated by links having directional arrows. Configured for shortest path routing, the route finder preferably finds minimum cost routes for a list of connection requests between such pairs of source and destination nodes in the network.

Alternatively, the route finder may be configured to "balance" connections across the network. Balancing the connections may be achieved by taking into account an integer number K shortest paths between the source and destination node of each connection, and selecting the shortest path for each connection which yields an even distribution of network node and link utilizations.

Referring again to FIG. 8 herein illustrates a generic network graph of nodes and links illustrating how balancing of traffic across the network is achieved. Whereas a shortest path routing would force traffic between source S node n_1 and destination node n_7 and traffic between source 801 node n_1 and second destination 802 node n_8 through nodes n_2 and n_6, placing congestion on nodes n_2 and n_6, by considering an integer number k shortest paths, traffic from source n_1 to first destination n_7 may be routed through alternative nodes n_3 and n_5, whilst traffic between source n_1 and second destination n_8 may continue to be routed through nodes n_2 and n_6, thereby balancing traffic across different routes of the network and achieving more uniform loading of nodes and links with traffic data.

The route finder component 207 may route a single connection over several different routes. This "splitting" of connection over routes may be necessary where the connection requires a high bandwidth capacity. The number of routes over which such a connection request may be split can be entered by a user, or the route finder itself may decide the number of routes over which to split the connection request up to a user defined upper band. The percentage of bandwidth capacity of a connection request to be divided across the number of selected routes can also be chosen by the user. For example, if the connection request's bandwidth capacity is to be divided across a first and a second route then 30% of the connection request's bandwidth capacity can be carried across the first route and 70% of the connection request's bandwidth capacity can be carried by the second route.

A single connection may be distributed across multiple paths across the network. Traffic between source node n_1 and destination node n_7 in response to a service request may be carried over an integer number of multiple paths. For example, a first route may traverse nodes n_2 and n_6, carrying 70% of the data of the service. A remaining 30% of the data of the service may be routed via nodes n_3 and n_5. The distribution of routes may be user specified, or alternatively optimized by genetic algorithms. A default condition whereby a single route carries all traffic relating to a source-destination service request may be set by a user.

Figure 9:
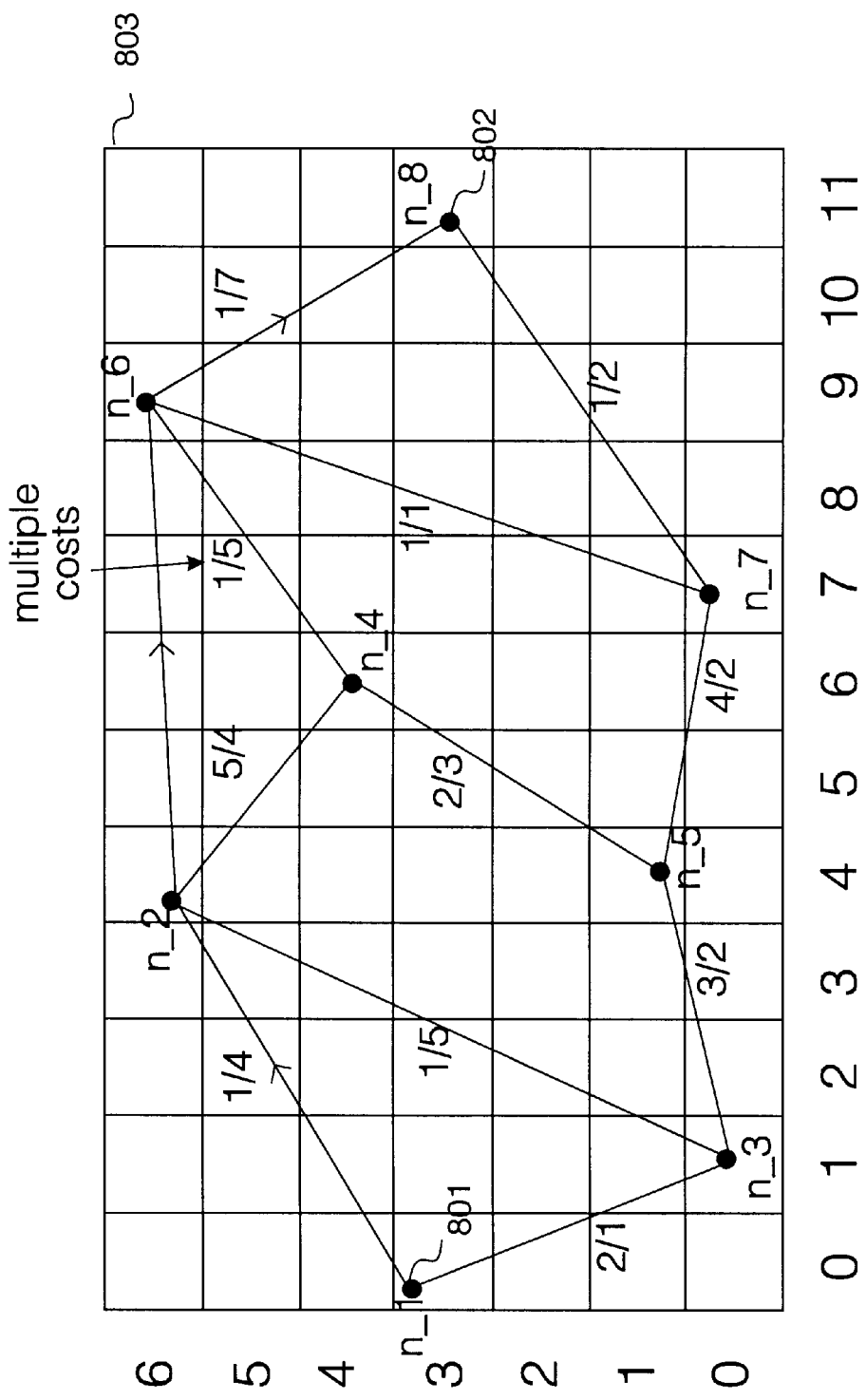
FIG. 9 illustrates the generic representation of a network identified in FIG. 3 combined with elements used by the route finder including multiple costs.

FIG. 9 of the accompanying drawings illustrates the network graph nodes and links shown in FIG. 8 but with the network links having multiple costs, denoted by numerical values separated by a slash symbol (/). The multiple costs may be associated with different traffic types, eg voice or data. The route finder any select paths for connections taking into account the traffic type used by the connection.

Point to multipoint traffic cannot be dealt with by shortest path routing. In the specific methods presented herein, the route finder component 207 may deal with point to multipoint traffic as illustrated with reference to FIG. 9 herein as follows. For traffic originating at source node n_1 and terminating at multiple destinations nodes n_8 and n_7, routes n_1, n_2, n_6, n_8 and routes n_1, n_3, n_5, n_7 may be selected, or routes n_1, n_2, n_6, n_7 and route n_1, n_2, n_6, n_8 may be selected. Other combinations are possible even in the simple example illustrated with reference to FIG. 9. Further, for point to point or point to multipoint services, routing may be selected according to traffic data type.

A user may interact with a route finder component 207 by use of graphical user interface 211, to edit and alter data already input from a network application or to enter data directly. Data editing and entry is achieved by manipulation of a cursor icon using a computer peripheral pointing device, eg a mouse, trackball device or similar, across a series of display screens, various ones of which are described hereunder.

Figure 10:
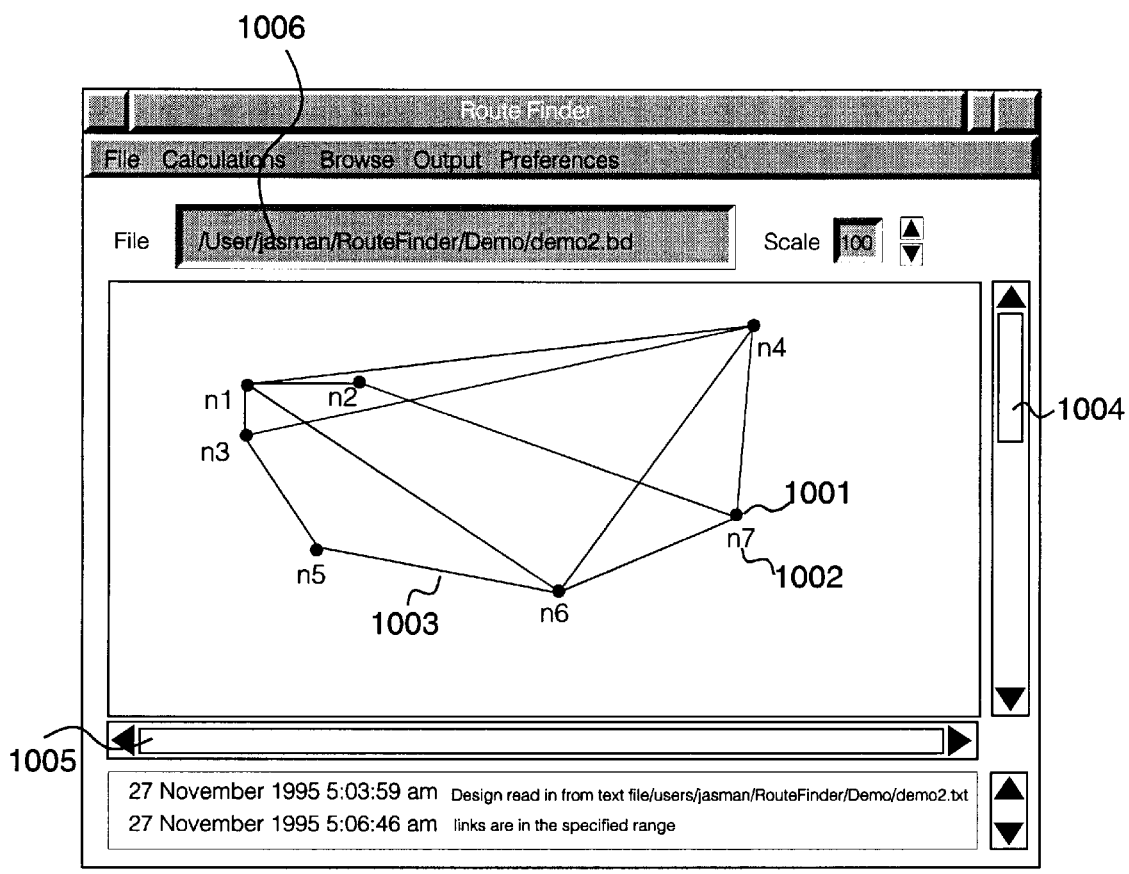
FIG. 10 illustrates diagramatically a screen display produced by the graphical user interface identified in FIG. 4 which a user may use to create or edit network data.

FIG. 10 of the accompanying drawings illustrates a network data editor screen display which a user may use to create or edit network topology data. The network data editor, which is part of the GUI 211, may be used to produce network data for the route finder engine 209 as an alternative to network data pre-processor 401 receiving network topology data 408 and converting it to an SAP file. Nodes 1001 appear on the display window of a screen as icons and given labels 1002. Links between nodes can also be drawn, represented by lines 1003. The display includes a horizontal scroll bar 1005 and a vertical scroll bar 1004 which the user may use to draw a network topology of greater area than currently shown in the display window. The network topology data drawn is saved using a file name 1006. The file saved is preferably a file conforming to the SAP format.

Figure 11:
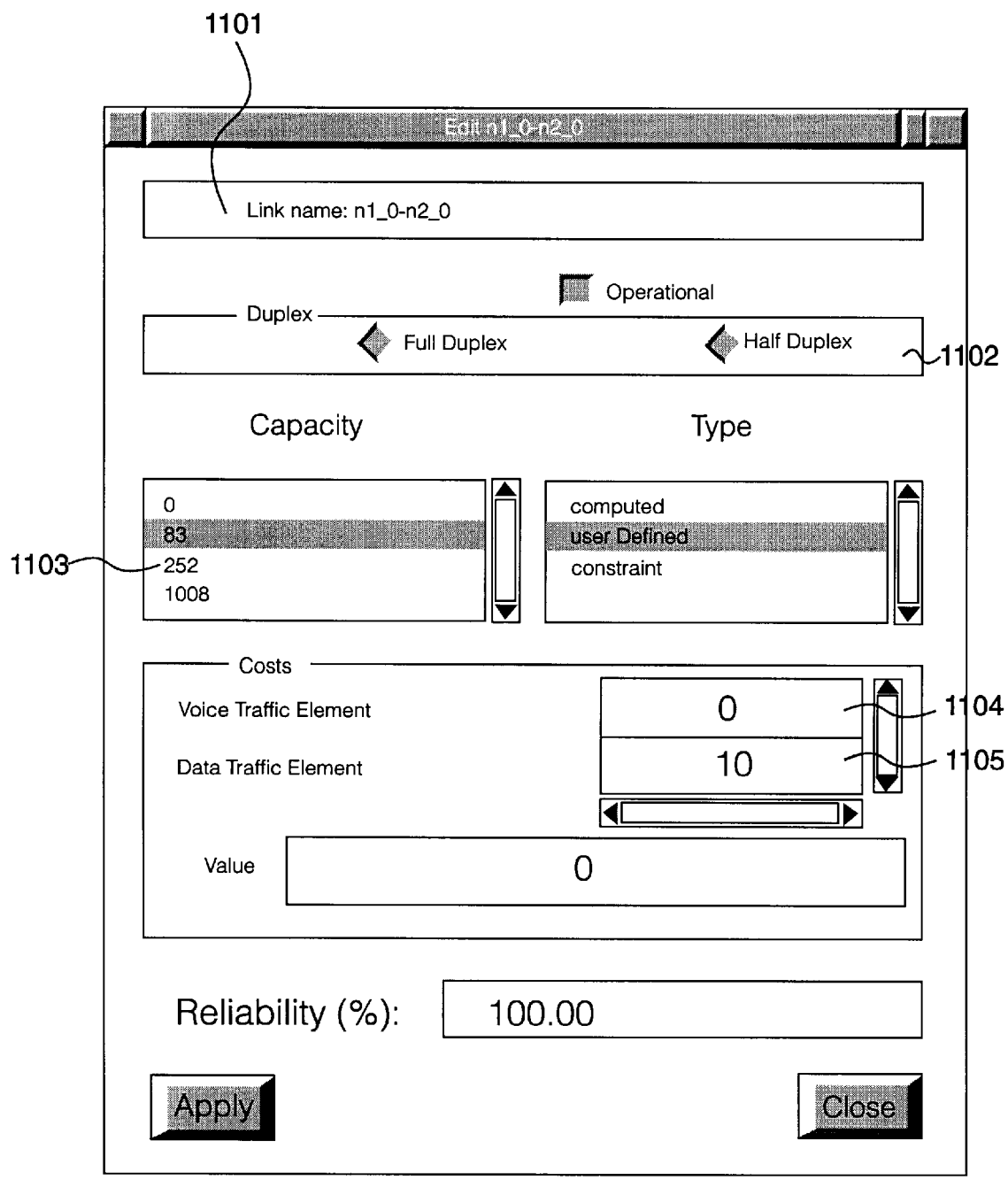
FIG. 11 illustrates diagramatically a screen display produced by the graphical user interface identified in FIG. 4 which a user may use to edit data describing network links.

FIG. 11 of the accompanying drawings illustrates a link data editor screen display which a user may use to edit data describing network links. The link data editor part of the GUI 211, may be used to produce network data for the route finder engine 209 as an alternative to network data pre-processor 401 receiving network topology data 408 and converting it to an SAP file. The screen display comprises a dialog box showing a name of a link, that is, the link's two end points (each end point having a node label and a port number). The display also comprises two icons 1102 which may be used to specify whether the link is for full duplex or half duplex (ie bi or uni directional, respectively). A bandwidth capacity of the link may also be edited by selecting a numerical value which is presented in a scroll menu display 1103. Costs associated with a link may also be entered and edited, for example a cost of voice data for the link may be edited by entering a numerical value 1104, in a cost data entry portion of the display window 1104. Likewise for data traffic 1105.

FIG. 12 of the accompanying drawings illustrates an example of a text file having SAP format which may be entered into the route finder engine from network data pre-processor 403 or resulting from the network topology data editor shown in FIG. 10 or the link data editor shown in FIG. 11. A file in SAP format may comprise a plurality of lines containing ASCII characters with each line terminated by an ASCII new line character. For the route finder's input, the SAP file comprises a plurality of sections, with each section having a header line followed by one or more data description lines.

Network nodes are described in a nodes section. A header line 1201 for a node section comprises:

[nodes]

A node description line 1202 comprises a node label which acts as an identifier for the node, XY coordinates corresponding to a coordinate grid of a node and a numerical value denoting capacity. An example node description line compnses:

n_1 {0 3 1}

This denotes a node n_1 at XY coordinates 0, 3 with a capacity of 1.

A link section describing network links has a header line 1203 comprising:

[links]

A link description line 1204 defines a single link between a pair of nodes. A link description line may comprise two end points (each end point described by a node label and a number representing a node port), a value denoting the total capacity of the link and an identifier indicating whether the link is simplex or duplex (ie whether traffic on the link can be uni- or bidirectional). An example of link description comprises:

{n_11} {n_2 1} 622 NetworkLinkDuplex

This denotes a link from port 1 of node n_1 having node port 1 and port 1 of node n_2, having a capacity of 622, and being a duplex unit.

Data describing an amount of capacity of a link already in use is given in a link state section. A header line 1205 for a link state section comprises:

[linkstate]

A description line describing link state capacity usage 1206 may comprise two end points and a numerical value denoting link capacity used, eg:

{n_1 1} {n_21} 402

This example represents a link between port 1 of node n_1 and port 1 of node n_2, having 402 units of capacity already allocated. The route finder engine does not place unit of measurement on the number of 402 units. Thus, as long as the capacity and load utilization are measured in the same units, the numerical values denoting capacity and load can both be sent to the generic route finder engine 209.

Data describing current utilization of a node's capacity is given in a node state section. A header line 1207 of a node state section comprises:

nodestate

A node state description line 1208 may comprise a node label (which should be already defined in a node description section, any lines containing undefined node labels will be ignored) and a value denoting current capacity utilization of the node, for example:

n_1 1

For example, node n_1 has a present allocated capacity of 1. No unit of measurement is placed on the file by the generic route finder engine, since the route finder manager 208 sends all data to the generic route finder engine in the same units.

Data describing reliability of a link is given in a link reliability section. A header line 1209 for a link reliability section comprises:

[linkReliability]

A link reliability description line 1210 defining reliability of a single link may comprise two end points (each having a node label and a port number) and a real number having a value between 0 and 1.0 (1.0 denoting 100% link reliability), eg:

{n_1 1)} {n_21} 0.999

This example represents a link between port 1 of node n_1 and port 1 of node n_2, having a link reliability factor of 0.999.

Data describing reliability of a node is given in a node reliability section. A header line 1211 for a node reliability section comprises:

[nodeReliability]

A description line 1212 defining reliability of a single node comprises a node label and a real number having a value between 0 and 1.0 (1.0 denoting 100% node reliability):

n_1 0.995

This denotes a node n_1 having a reliability factor of 0.995.

Data describing costs associated with links is given in a costs section. A header line 1213 for a costs section comprises:

[costs]

A description line 1214 defining the cost of a single link comprises two end points (each end point having a node label and a port number) and one or more data types with a numerical value representing the cost, eg:

{n_1 2} {n_2 3} {data 1} {voice 2}

This example illustrates a link between port 2 of node n_1 and port 3 of n_2 which has a cost value of 1 for data service traffic and a value of 2 for voice service traffic. That is to say, the link has a lower cost for data traffic than for voice traffic. The measurement of cost has no unit. The cost value is used by the generic route finder engine to find shortest paths from which a final choice of paths is made and is used in the calculation of minimum spanning trees.

Figure 13:
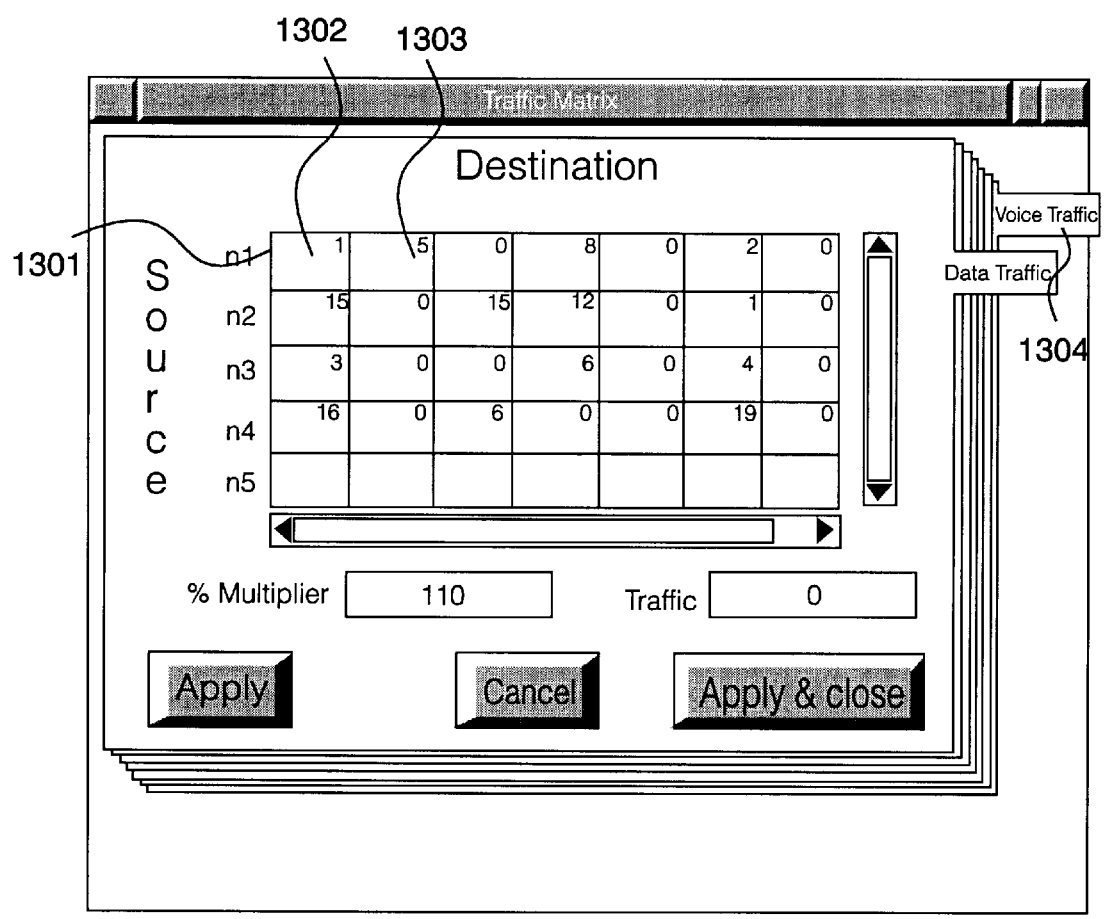
FIG. 13 illustrates diagramatically a screen display produced by the graphical user interface identified in FIG. 4 which can be used to generate a service request data.

FIG. 13 of the accompanying drawings illustrates a screen display which can be used to generate service requests. The screen display is generated by a service request generator, part of the GUI 211, which may be used to generate service requests for the route finder engine 401 as an alternative to service request pre-processor 400 receiving service requests from an external application and converting them to a SAP file. The screen display comprises a two dimensional table in which vertical entries 1301 represent source nodes and horizontal entries 1302 represent destination nodes of connections. Entries 1303 in the table represent service request numbers for connections between the entry's source and destination nodes. The display also includes a selector 1304 used to select the type of traffic, eg voice or data, required by the service requests.

Figure 14:
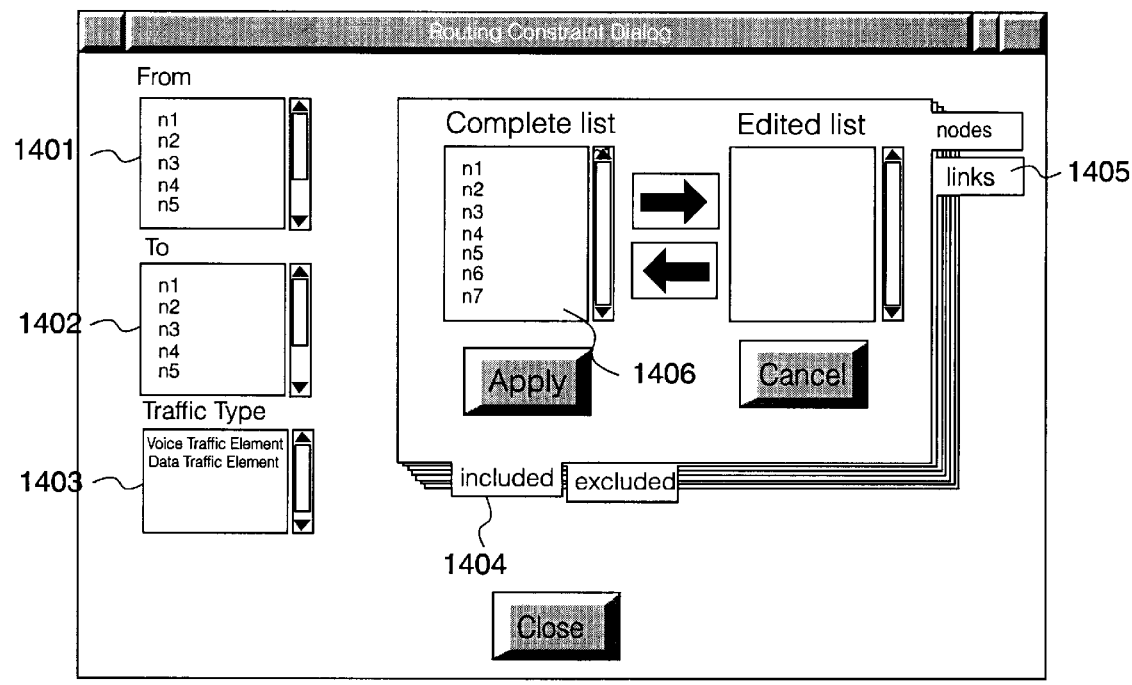
FIG. 14 illustrates diagramatically a screen display produced by the graphical user interface identified in FIG. 4 which may be used to create or edit data representing constraints on routes found for specified service request.

FIG. 14 of the accompanying drawings illustrates a screen display which can be used to create or edit data representing constraints on routes found for specified service requests. The screen display is generated by a constraints data creator part of the GUI 211, which may be used as an alternative to service request pre-processor 400 receiving service requests from an external application including route constraints and converting them to a SAP file. The screen display comprises a dialog containing a scroll box 1401 which may be used to select a source node. The display also comprises a scroll box 1402 which may be used to select destination node(s). The display also comprises a scroll box 1403 used to select the traffic type between the selected source and destination nodes which is to be constrained. The display comprises two selection boxes 1405 used to select whether nodes or links are to be selected. Two buttons 1404 are also used to select whether the selected nodes or links will be excluded or included from the route. A list of nodes or links 1406 is also shown in the display, depending upon whether nodes or links were selected using selection boxes 1405. Nodes or links may be selected from list 1406 in order to generate constraints which will be included or excluded for routes found between the selected source and destination nodes selected using scroll boxes 1401 and 1402, respectively.

FIG. 15 of the accompanying drawings illustrates an example text file having SAP format which may be entered into the route finder engine from an external application via service request pre-processor 400 or by the traffic data editors shown in FIG. 13 and FIG. 14. The example shown in FIG. 15 illustrates sections defining data relating to network traffic. The SAP file comprises a number of sections, with each section having a header line and one or more description lines.

Service requests having one source node and one destination node (called point to point service requests) are described in a traffic section. A header line 1401 for a traffic section comprises:

[traffic]

A description line 1502 for a point-to-point service request comprises a numerical identifier for the service request, a source node label, a destination node label, a numerical value denoting capacity required by the service, a traffic type identifier and a numerical value denoting number of routes over which to split total capacity requirement, and a splitting mechanism. The splitting mechanism may be a symbol * indicating that the route finder engine determines a percentage split of traffic over the indicated number of routes, rather than this split being determined in the service equipment. An example description line for a connection request is:

983 n__1 n__8 165 data {5 *}

This example specifies that a service request identified as service request 983 comprises a point to point request for service connection between node n__1 and n__8 having a consumption of 165 units of bandwidth, and which is to use 5 routes. The symbol *denotes that the percentages of data traversing each of the 5 routes are to be determined by the generic route finder engine.

Alternatively, the point to point service request description line will include numerical values instead of the symbol * which denotes the percentage split, for example to split capacity equally (50% to 50%) over two routes. For example:

984 n__2 n__3 210 voice {2 50 50}

In this example, the service request identified as number 984 between node n__2 and n__3 having capacity consumption of 210 units carries voice data traffic over 2 routes split equally at 50% over each route.

Data describing service requests with one source node and two or more destination nodes (called point-to-multipoint service requests) is described in a multi-point section. A header line for a multi-point section 1504 comprises:

[multipoint]

A description line 1505 defining a point to multi-point service request may comprise a numerical service request identifier, a source node label, a plurality of destination node labels and a numerical value denoting capacity required by the service request. For example:

985 n__1 {n__2 n__3} 160 data

This example indicates a service request identifier 985 being a multi-point connection between node n__1, and nodes n__2 and n__3 with a bitrate consumption of 160 data units, carrying data type traffic.

Data describing constraints on a service request, ie nodes and/or links which should be included or excluded in a route found for the service request, is described in a constraints section. A header line 1506 for a constraints section comprises:

[constraints]

A description line 1507 defining links which should be included in a route for a particular service request comprises a numerical value corresponding to a defined service request (point to point or point to multi-point), the word "include", the word "link", and a list of one or more links with each link listed comprising two end points (each end point comprising a pair of node labels and ports), eg:

983 {include links {{{n__11}{n__2 1}{n__ 22}{n__3 2}}}

This example denotes a service request identified as number 983 including links between Port 1 of node n__1 and Port 1 of node n__2, and Port 2 of node n__2 and Port 2 of node n__3.

Similarly, the above could be excluded from route(s) found for the services request by replacing "include" with "exclude".

A description line 1508 defining nodes to be excluded from route(s) found for a particular service request comprises a numerical service request identifier, the word "exclude", the word "node" and a list of node labels, eg:

983 {exclude nodes {n__2 n__6}}

Excludes nodes n__2 and n__6 from routes carrying service requests identified by identifier 983.

Similarly, the above nodes could be included from the route(s) found for the service request by replacing "exclude" with "include".

FIG. 16 of the accompanying drawings illustrates an example of a SAP format file. The example file shown in FIG. 16 includes sections defining evaluation function related parameters. Data describing parameters which the route finder engine's genetic algorithms may consider when determining routes for service requests are described in a problem parameters section. A header 1601 for a problem parameters section comprises:

[problemparameters]

Routing objective data 409 which the route finder engine takes into account when finding routes for service requests can be given a weighting in order to determine which route selection to make in certain circumstances. For example if having a short as possible route for each connection was twice as important as balancing utilization of nodes and links across the network then description lines 1602–1603 for a problem parameters section could include:

pathlengthweight=10 balancingweight=5

Data setting various parameters used by the route finder's genetic algorithms may be given in a GA parameter section. A header line 1604 for a GA parameter section comprises:

[gaparameter]

The GA parameter section's description lines comprise parameters and their values, for example a number of iterations which the route finder may run its genetic algorithms on input data may be set by:

Steps=1000

In practice, the SAP files illustrated in FIG. 12, FIG. 15 and FIG. 16 of the accompanying diagrams may be included in one SAP file and entered into the route finder engine 401.

Figure 17:
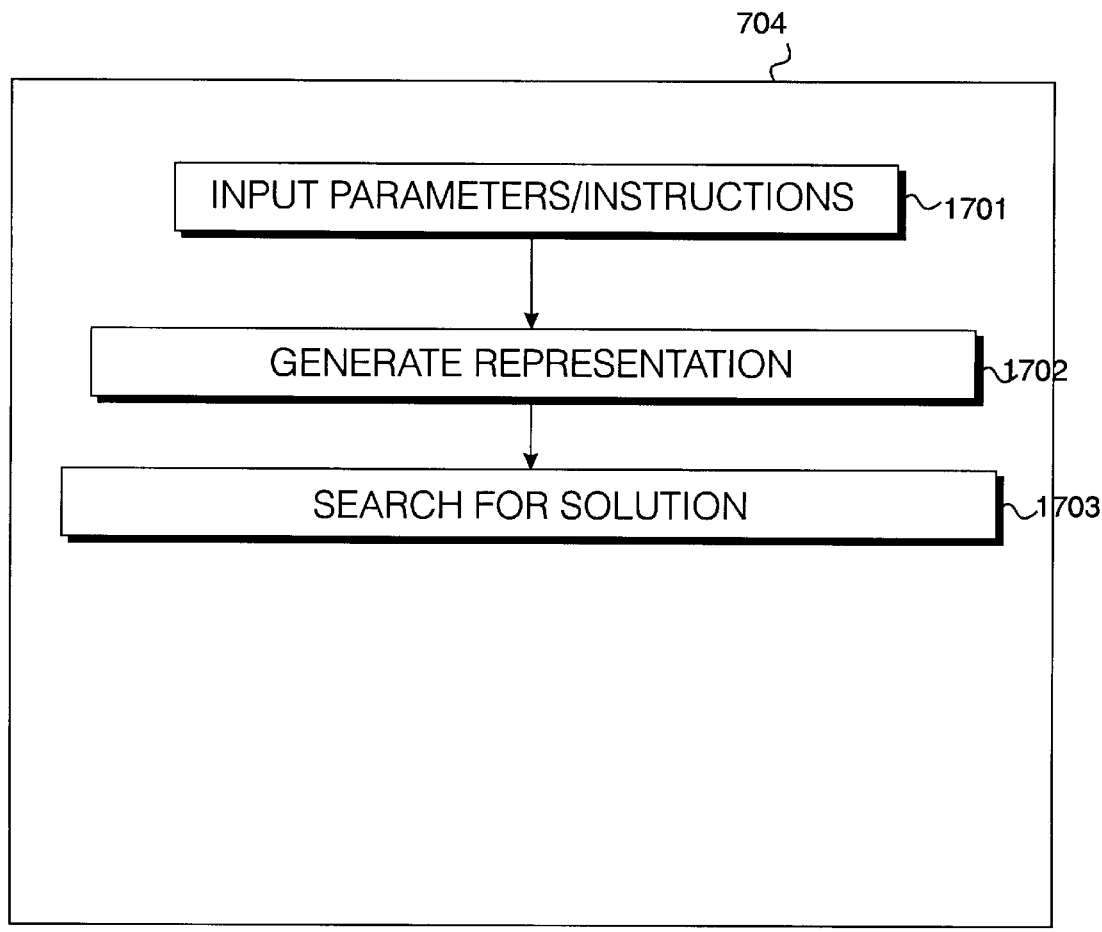
FIG. 17 illustrates schematically steps executed by the route finder engine, including a generate representation step and a search for solution step.

FIG. 17 of the accompanying drawings illustrates steps executed during step 704 of FIG. 7 which applies the route finder's genetic algorithms to find routes for the service requests entered.

At step 1701 the parameters and instructions are entered into the route finder engine. The parameters which may be entered comprises variables which may be used to control the route finder engine's genetic algorithms. The variables may be given values by us ing a "set" which has a instruction of the form:

Set <variable name> <value> where <variable name> is a name of a supported route finder engine variable, and <value> is a value to be assigned to the variable.

The v ariables supported by the GA meter engine comprise:

| Name | Meaning |
| --- | --- |
| crossoverProb | Crossover Probability |
| mutationProb | Mutation Probability |
| poolSize | Size of population |
| miniParents | Minimum number of parents |
| maxParents | Maximum number of parents |
| subpopPercentOfChromosomes | Percent of population selected |
| lambda | Used in exponential selection mechanism |
| bestFitInnacuracy | Used in merging solutions |
| tendencyPressure | Pressure applied in selecting solutions |
| replacePressure | Pressure applied when merging solutions |
| mergeMechanism | Mechanism used when merging solutions |
| crossoverMechanism | Mechanism used in crossover |
| noOfCrossoverPoints | Number of crossover points |
| selectedMechanism | Mechanism used for selection |
| statsCollectionMechanism | Mechanism used for selection |
| statsCollectionMechanism | Collects stats, per generation or new solution |
| randomSeedMechanism | Mechanism used for random seed generation |
| randomSeed | Random seed used |
| terminateAfterTime | Force experiment termination after time |
| maximumTime | Maximum time allowed |
| terminateAfterGens | Force termination after specified generations |
| maximumGens | Maximum generations allowed |
| maximumNoChangeGens | Maximum number of generations allowed without finding a new solution |
| statsFileFormat | Format of statistics file |
| noExperiments | Number of experiments to perform |
| experimentTime | Total experimental time allowed |
| problemFileName | Name of the file containing the Network Data |
| solutionFileName | Name of the file to be used to store solution |
| statisticsFileName | Name of file to be used to store statistics information |
| settingsFileName | Name of file to be used to store the Route Finder engine settings |
| experimentFileName | Name of file containing experimental definitions |
| summaryFileName | Name of the file to be used to store summary information |
| statsUpdateFreq | Frequency with which routes are generated |
| expStatsFileName | Name of the file to be used as a base in computing file names used to store experimental results |
| steps | Number of evaluations to perform before stopping |
| pathLengthWeight | Path length/cost weighting coefficient for objective function |
| balancingWeight | Link utilization balancing weighing coefficient for objective function |
| bestPathSeed | Use the best paths to seed a member of the population |
| variables | Used to get a list of all variables that can be modified/read within the route finder engine, ie the first column of this table |
| numPaths | The number of shortest paths to compute for each point to point traffic demand |
| variables | The variables defined within RouteFinder |
| population | The bitstrings which constitute the current population |
| diversity | A floating point value between 0 and 1 which indicates the genetic variety of the population. A value closer to zero indicating a less-diverse population |
| statistics | Text which describes the performance of RouteFinder |
| cellLossWeight | Weighting associated with the cell loss term in routing objective |
| cellDelayWeight | Weighting associated with cell delay term in routing objective |
| linkReliabilityWeight | Weighting associated with link reliability term in routing objective |
| nodeReliabilityWeight | Weighting associated with node reliability term in routing objective |
| nodeUtilizationWeight | Node utilization balancing weighting coefficient in routing objective |

As illustrated with reference to FIG. 5 herein, the instructions which may be entered into the route finder engine include a "command" instruction. The command instructions are interpreted by engine control process 600 of the route finder generic engine 209 to load or save files, start an optimization process, or terminate operation of the generic route finder engine. A command instruction has a number of distinct forms, including:

command end—this causes the route finder engine to terminate normally command reset—causes a random initial population to generated command run—commences the search for routes for entered service requests command load/save—allows route finder engine data to be loaded or saved to an external store such as a disc drive. Route finder engine data which may be saved or loaded includes the parameter variables and values described above and routes found by the route finder engine.

A batch file comprising "set" and "command" instructions may be created and saved using a filename. Such a batch file may be executed by the route finder engine by an instruction:

execute <filename>.

At step 1702 a representation is generated. A representation for a route for a point-to-point connection request comprises a string of contiguous bits.

Figure 18:
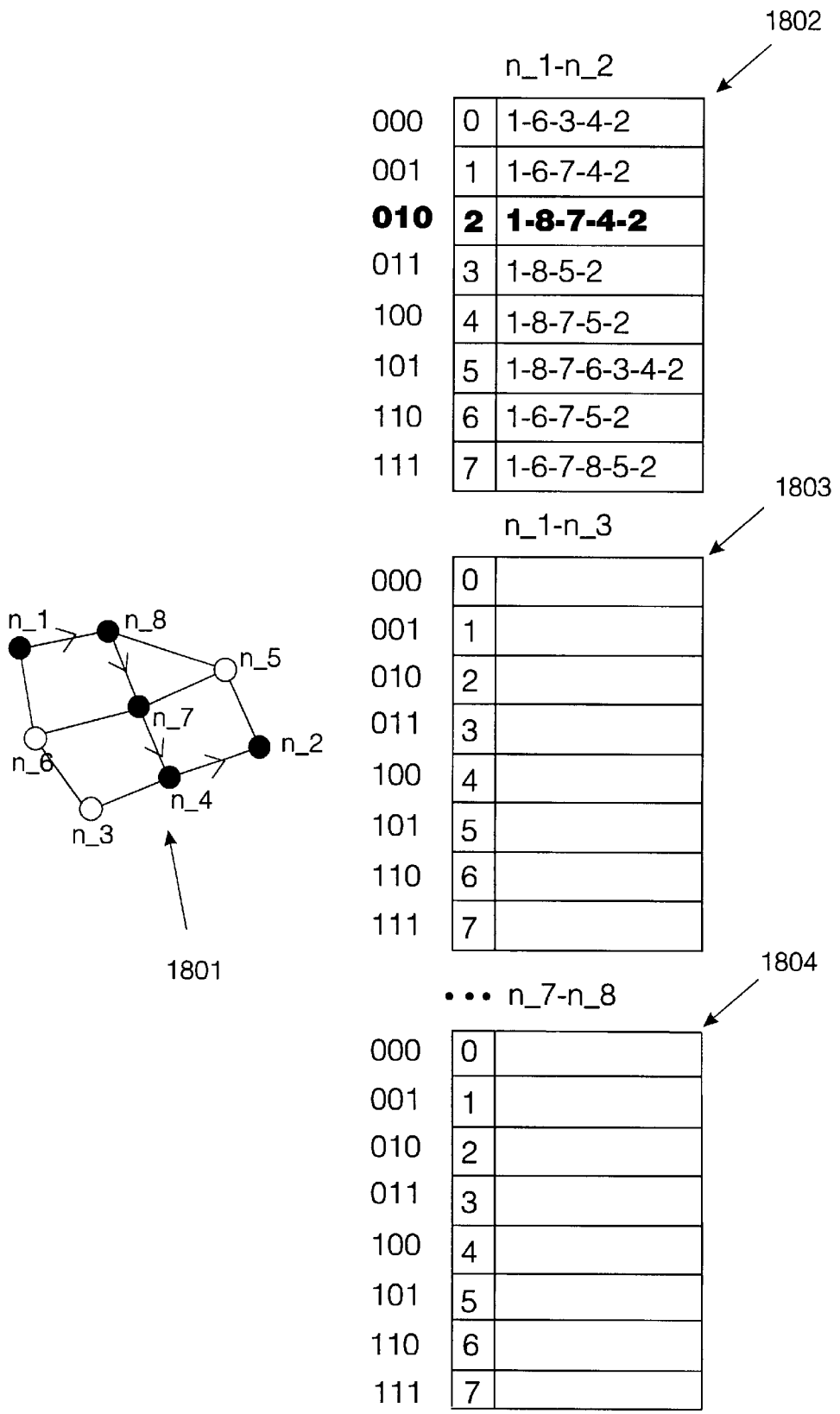
FIG. 18 illustrates bit strings which may be produced by the generate representation step identified in FIG. 17.

FIG. 18 of the accompanying drawings illustrates as an example a graph 1801 of nodes (labeled in n__1 to n__8) and links. For each pair of nodes in the graph 1801 an array of k (where k is an integer) shortest routes between the two nodes is created. For example, array 1802 contains eight entries, each entry comprising a list of nodes in a route between node n__1 and node n__2 of graph 1801. Each entry is calculated using the known Yen-Lawler algorithm which produces k (where k is an integer) shortest routes between any two nodes in a graph. For example, the path between node n__1 and n__2 highlighted in graph 1801 by black nodes and directional arrows on links corresponds to the path stored in entry 2 (010 in binary) of array 1802. Arrays of eight shortest routes for each pair of nodes in the network are created during the generate representation step 1802. For example, array 1803 contains eight shortest routes between node n__1 and node n__3 of graph 1801 and array 1804 contains eight shortest routes between node n__7 and node n__8 of graph 1801. The representation defines lengths of bit strings used by the route finder's genetic algorithms. Each bit string comprises three bits (three bits used to index an array of 8 shortest routes as described above, using standard binary representation of numbers 0 to 7:000, 001, 010, 011, 100, 101, 110, 111) for each point-to-point connection request, for example 20 point-to-point connection request would result in a string of 20×30=600 bits.

Point to point connection requests are effectively represented as an index into a look-up table. Because a same number of routes are computed for each point to point connection request, each request has a same bit string length representation, and so every member in the population also has a fixed length of bit string.

At step 1703 of FIG. 17 the route finder engine uses the representation generated to search for routes for entered point-to-point connection requests according to the parameters and instructions entered at step 1701.

Figure 19:
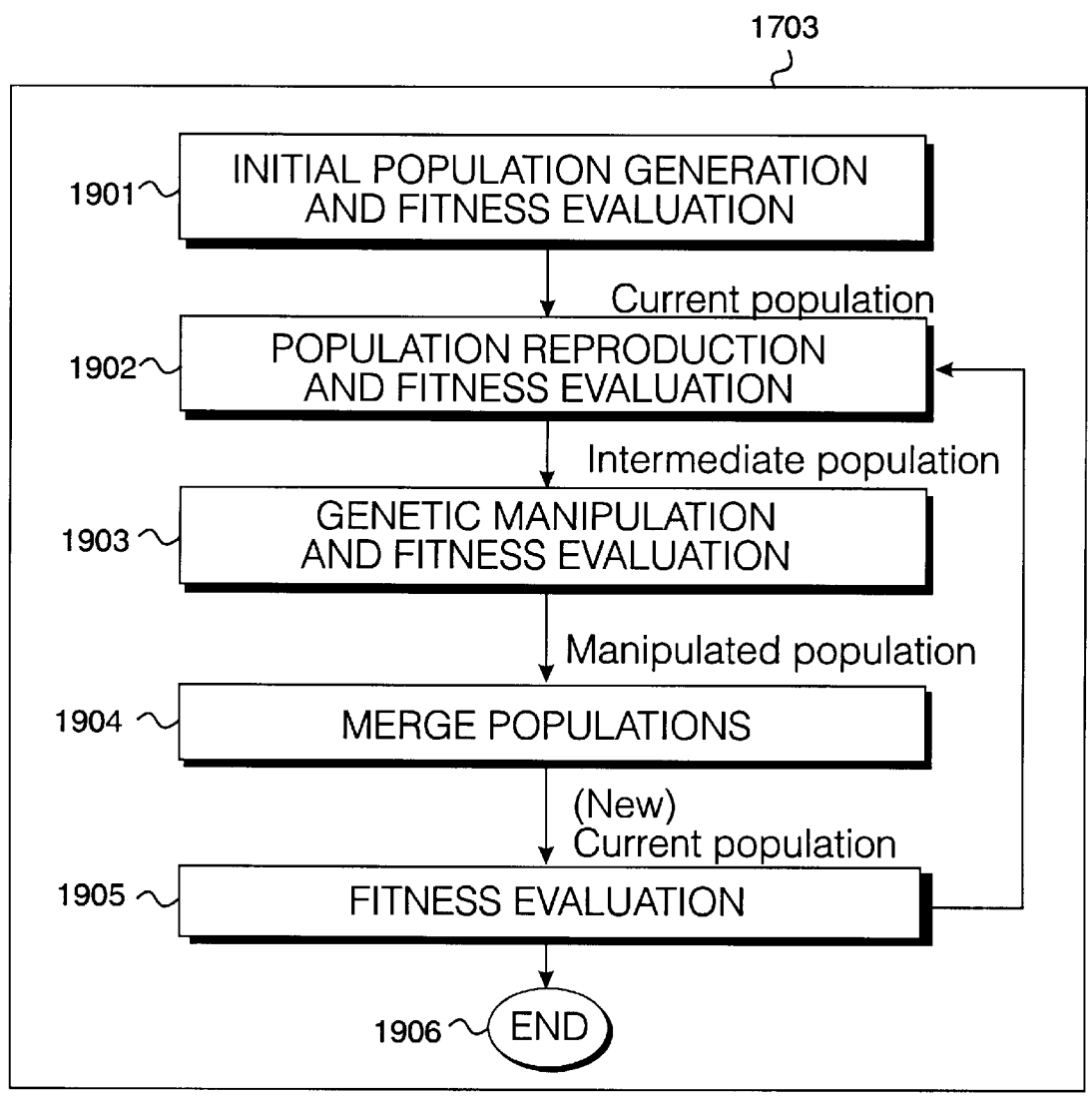
FIG. 19 illustrates schematically steps executed by the search for solution step identified in FIG. 17 including a generate initial population step, fitness evaluation, and genetic manipulation step.
Figure 20:
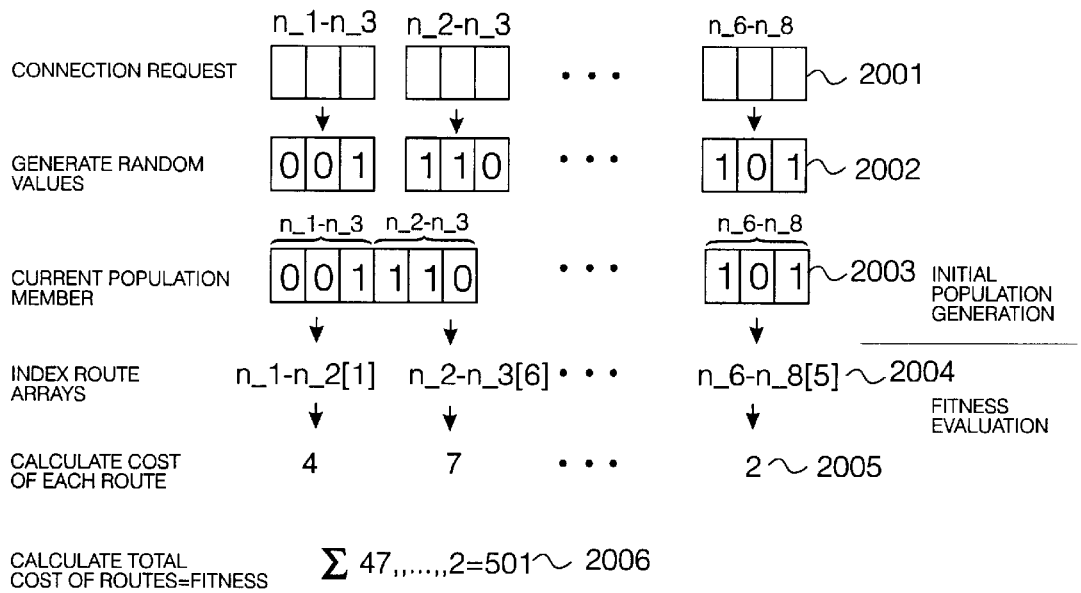
FIG. 20 illustrates schematically the generate initial population step and fitness evaluation step identified in FIG. 19.

FIG. 19 of the accompanying drawings illustrates steps executed by the route finder engine to route point-to-point connection requests at step 1703 of FIG. 17. At step 1901 the route finder creates an initial population each member of which comprises a bit string having a length determined by the representation generated at step 1702. The bit string length is determined by the number of paths computed for each connection request, multiplied by the number of connection requests, ie a search "space" of possible route solutions. The initial population generated comprises a plurality of members, each member having random bit values. Random bit values in the bit strings for each point-to-point connection request represent for example a 3 bit binary number which is used to index the array of for example eight shortest routes for that point-to-point connection request, see 2001 and 2002 of FIG. 20 herein. In general, the number of paths used is user configurable, and the number of bits needed to represent the number of paths used is calculated according to log (k)/log (2), where k is the number of paths chosen. Output of the initial population generation step 1901 is called a current population 2003. A fitness evaluation process is invoked in order to compute a fitness of each current population member. The current population in then sorted according to its fitness. The fitness evaluation process assigns a single numerical value 2006 to each population member in order that the members can be ranked and used in later steps of FIG. 19.

In the route finder engine, the fitness evaluation process indicates increased desirability of a population member by a lower fitness numerical value, that is, the route finder engine's genetic algorithms search for a minimum numerical value. The fitness numerical value of each population member is calculated by using the binary numbers encoded within the bit string for each point-to-point connection request to index that connection request's eight shortest routes array—2004. The cost of traversing the links of the indexed route is then calculated and a numerical value is produced for each route—2005. A numerical value denoting the fitness evaluation of the population member is then calculated by adding up the numerical cost of each route of each point-to-point connection request in the population member to give a numerical fitness value 2006.

At step 1902 population reproduction occurs to create an intermediate population. The intermediate population is generated by sampling—with replacement—the current population according to a distribution which is fitness related and defined by parameters entered into the route finder engine at step 1901 in accordance with routing objective data 409. The intermediate population is the same size as the current population and has a decreased average fitness numerical value, ie more desirable, when compared to that of the current population.

Figure 21:
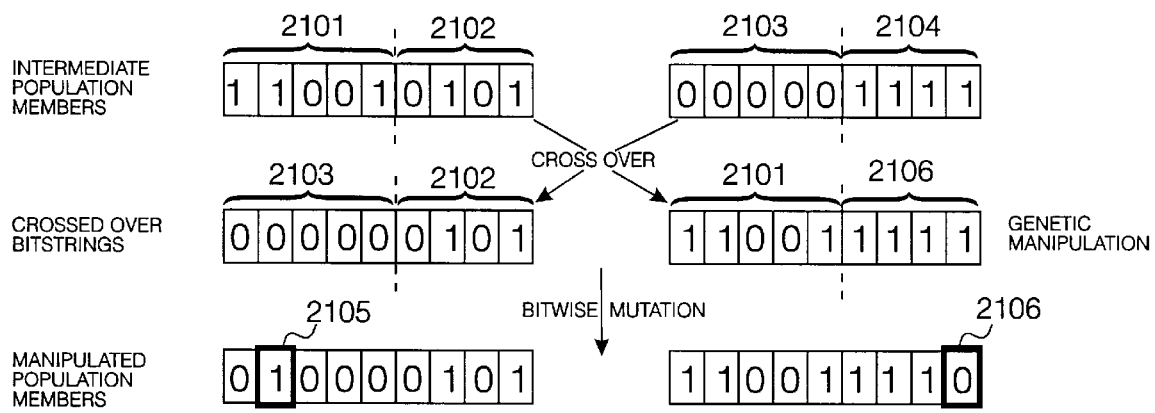
FIG. 21 illustrates schematically steps occurring during the genetic manipulation step identified in FIG. 19.

At step 1903 the intermediate population is genetically manipulated to produce a manipulated population. The genetic manipulation involves cross-over and mutation operations. FIG. 21 of the accompanying diagrams illustrates an example of genetic manipulation. Two intermediate population members, each being a string of nine bits are shown. The cross-over operation involves swapping a number of bits of one population member with another, the number of bits being determined by parameters entered into the route finder engine at step 1701. In the example shown in FIG. 21 a first intermediate population member comprises of five left most bits 2101 and four right most bits 2102. A second intermediate population member comprises five left most bits 2103 and four right most bits 2104. In the example shown we assume that the cross-over operator is set up to swap five left most bits of population members. After the cross-over operation has occurred the first intermediate population member comprises five left most bits 2103 and four right most bits 2102 and the second intermediate population member comprises five left most bits 2101 and four left most bits 2104. After cross-over has occurred a bit wise mutation operation is applied to the crossed-over population members. The mutation operator used is determined by parameters entered into the route finder engine at step 1601. In the example shown in FIG. 21 the bit wise mutation operation results in a single bit of each 9 bit long population member being inverted.

After generating the manipulated population, the fitness evaluation process is invoked in order to compute the fitness values of the manipulated population.

Finally, the genetic manipulation process sorts the manipulated population according to fitness value.

Balancing of traffic across the network is achieved as follows: firstly, an initial population of routes is selected from a plurality of routes generated for each source destination node pair which, whilst including a shortest path between a source node and destination node, also includes a plurality of other routes between the source and destination node which are not the shortest path. The selected routes for a source destination pair include for example the 8 shortest paths generated by a known shortest path algorithm, eg Yen-Lawler algorithm. A number of shortest paths generated per connection is specified in a SET and GET variable numpaths. Secondly, mutation, cross over and reproduction processes within the genetic algorithm introduce routes which are not shortest routes into a population of strings of bits representing routes.

Thirdly, the fitness criteria may be user specified to favor selection of bit strings which produce a relatively even distribution of link utilization across the network. The amount of capacity already utilized at each node is contained in the [nodestate] section of the SAP file. Similarly, the amount of capacity already used on each link is contained in the [linkstate] section of the SAP file. In the fitness evaluation stage, bit strings representing populations of routes which result in a relatively more even distribution of amounts of capacity utilized at the nodes and links are favored. For example, bit strings representing routes which cause utilization of a node or link above a predetermined threshold parameter may have a lower probability of being selected for inclusion in successive populations. A network operator may monitor utilization of individual nodes and links using a screen display as illustrated with reference to FIG. 24 herein.

At step 1904 a merge populations process is executed. The function of the merge population process is to take members of the current, intermediate and manipulated populations and form a new current population. Mechanisms used in this merged populations process are determined by particular control parameters entered at step 1701. At step 1905 the new current population generated at step 1904 has its fitness evaluated by the fitness evaluation process described above. Depending upon the number of iterations of genetic operations to be performed, determined by parameters entered at step 1701, control may be passed back to step 1902 or the genetic algorithms may terminate at step 1906.

The route finder engine outputs a list of routes corresponding to population members having the minimum fitness numerical value, ie the most desirable. The list of routes is generated by listing the nodes contained in the shortest path array element indexed by the bits for each point-to-point connection request in the fittest population member. The route finder engine outputs an SAP format file with a section describing the routes found for the service requests entered, an example of which is given in FIG. 22 herein. A header line 2201 for a routes section comprises:

[Routes]

A description line for a route sections has the following format:

{<no> <source> <destination> <traffic type> {<routes>}} wherein:

<no> comprises a numerical value corresponding to a service request number.

<source> comprises a label of the point-to -point connection request's source node.

<destination> comprises a label of the point to point connection request's destination node.

<traffic type> comprises the type of traffic being routed, eg data or voice.

<route> comprises a specification of the route found for a point-to-point connection request, specified as:
{{$n_1$ $p_1$} {$n_2$ $P_2$} ... {$n_m$ $p_m$}}
where nk represents a label of a node in the found route and Pk represents a port used on the node. An example of a route sections of description line 2202 may be:
{983 n__1 n__8 data } {n__1 1} {n__2 1} {n__6 1} {n__8 1 }}

A SAP file containing a routes section may be converted by route data post processor 403 into a routing table suitable for the external application which made the service requests.

Figure 23:
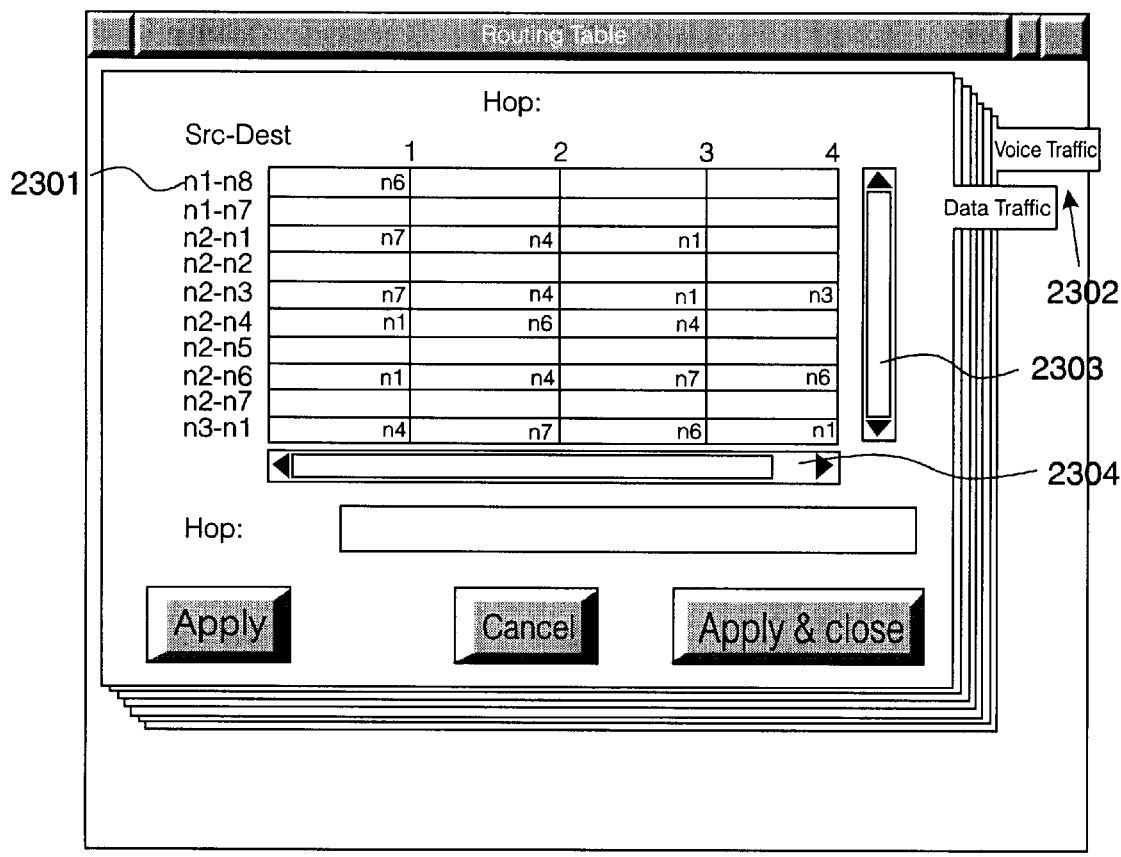
FIG. 23 illustrates diagramatically a screen display produced by the graphical user interface identified in FIG. 4, showing a routing table.

FIG. 23 of the accompanying diagrams illustrates a screen display which GUI 211 may produce to graphically illustrate a routing table using data produced by the route finder engine 209. The screen display comprises a window with a table 2301, each row of which represents a service request between a source node and a destination node of the network and each column of which represents a hop, ie a node contained in a route found for the service request. The screen display also comprises two selection buttons 2302 which may be used to show routing tables for traffic of different types, eg voice or data. The display also comprises a horizontal scroll bar icon 2204 and a vertical scroll bar icon 2303 which may be used to display connection requests and hops not visible in the current display.

Figure 24:
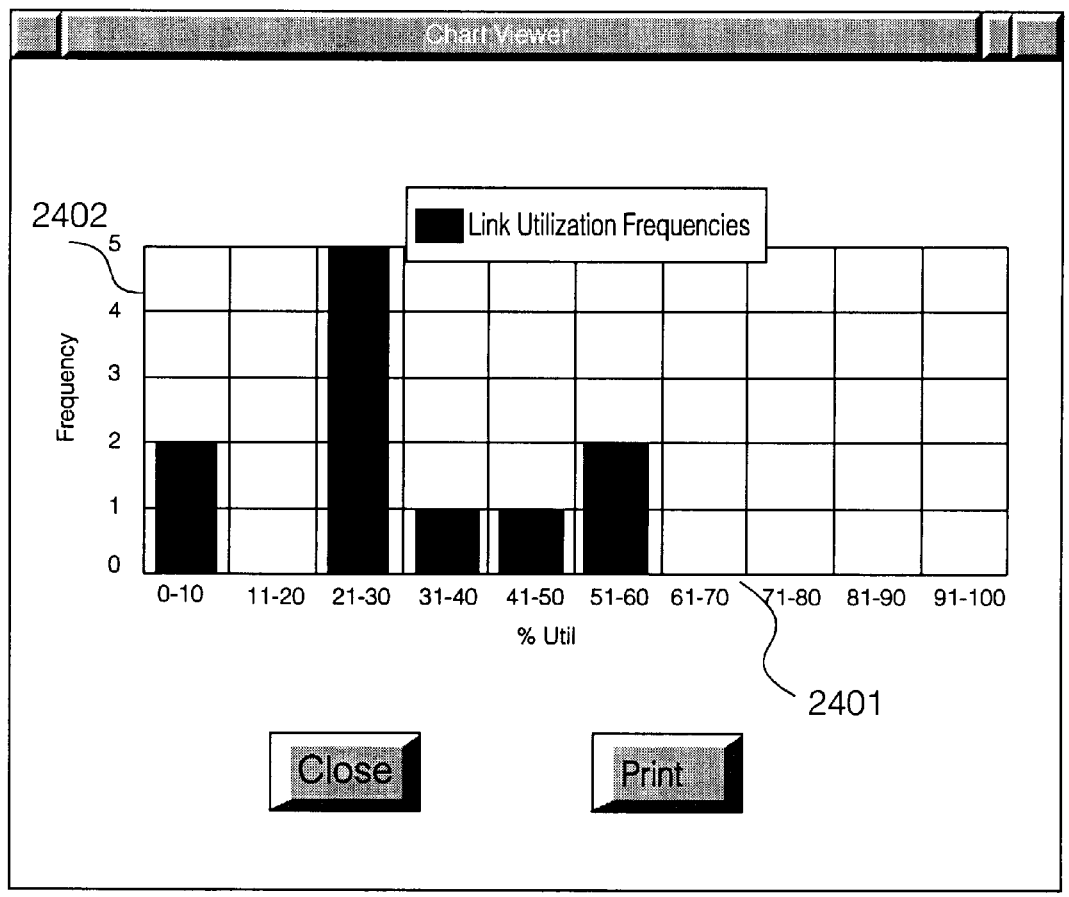
FIG. 24 illustrates diagramatically a screen display produced by the graphical user interface identified in FIG. 4 showing a link utilization chart.

FIG. 24 of the accompanying drawings illustrates a screen display showing a chart produced by GUI 211 using data produced by the route finder engine 209. A horizontal axis 2401 of the chart illustrates percentage utility of links in the network, whilst a vertical axis 2402 of the graph represents frequency of the percentage utilization.

What is claimed is:

1. In a network comprising a plurality of nodes and links, a method of simultaneously assigning a plurality of routes to a plurality of connections so as to optimize the links for said plurality of connections comprising the steps:

for each connection, generating data describing a plurality of routes for said connections, each said route represented as a bit representation;

assembling a plurality of said bit representations into a bit string representing a respective route for each of said plurality of connections;

creating a population comprising a plurality of said bit strings;

modifying said population of bit strings to rearrange order of bits within individual bit strings of said population;

for each bit string of said population, determining a utilization of each link in said network; and selecting said bit string having a relatively more even distribution of utilization across all said links so as to optimize the links for all said connections.

2. The method according to claim 1, comprising the steps of:

for each connection to be routed, generating a binary number representing an index to a list of routes between the source node and destination node of each connection; and forming a bit string from said binary numbers.

3. The method according to claim 1, wherein said bit strings are manipulated using genetic algorithm operations, including the process of reproduction, mutation, crossover and merging.

4. The method according to claim 1, wherein said step of evaluating a total cost comprises the step of:

adding costs of traversing each link in a selected routes.

5. The method according to claim 4, comprising the step of:

outputting said routes with minimum said total cost.

6. The method according to claim 1, wherein a plurality of routes are found for each said connection to be routed, a route cost of each of said plurality of routes not exceeding a connection cost of said connection to be routed.

* * * * *